United States Patent
Hwang et al.

(10) Patent No.: US 10,547,800 B2
(45) Date of Patent: Jan. 28, 2020

(54) PIXEL CIRCUIT AND IMAGE SENSOR INCLUDING THEREOF

(71) Applicant: Samsung Electronics Co., Ltd., Suwon-si (KR)

(72) Inventors: Min-ji Hwang, Seongnam-si (KR); Seung-jin Lee, Yongin-si (KR); Young-woo Lee, Seoul (KR); Seok-yong Hong, Seoul (KR)

(73) Assignee: SAMSUNG ELECTRONICS CO., LTD., Samsung-ro, Yeongton-gu, Suwon-si, Gyeonggi-do (KR)

(*) Notice: Subject to any disclaimer, the term of this patent is extended or adjusted under 35 U.S.C. 154(b) by 13 days.

(21) Appl. No.: 15/844,279

(22) Filed: Dec. 15, 2017

(65) Prior Publication Data

US 2018/0343404 A1   Nov. 29, 2018

(30) Foreign Application Priority Data

May 24, 2017 (KR) .................. 10-2017-0064388

(51) Int. Cl.
  *H04N 5/355* (2011.01)
  *H04N 5/3745* (2011.01)
  *H04N 9/04* (2006.01)

(52) U.S. Cl.
  CPC ....... *H04N 5/3559* (2013.01); *H04N 5/35554* (2013.01); *H04N 5/35581* (2013.01); *H04N 5/3745* (2013.01); *H04N 9/04557* (2018.08)

(58) Field of Classification Search
  CPC .................................................. H04N 5/3559

USPC ......................................................... 348/297
See application file for complete search history.

(56) References Cited

U.S. PATENT DOCUMENTS

| | | |
|---|---|---|
| 5,956,086 A | 9/1999 | Sawanobori |
| 6,999,119 B1 | 2/2006 | Shibazaki et al. |
| 7,557,846 B2 | 7/2009 | Ohkawa |
| 7,623,172 B2 | 11/2009 | Wada et al. |
| 7,745,779 B2 | 6/2010 | Conners |
| 7,964,929 B2 | 6/2011 | Fan |
| 8,466,998 B2 | 6/2013 | Suzuki |
| 8,520,105 B2 | 8/2013 | Funatsu et al. |
| 8,525,906 B2 | 9/2013 | Ui |
| 8,542,304 B2 | 9/2013 | Maeda et al. |
| 8,704,921 B2 | 4/2014 | Ishiwata et al. |
| 8,896,735 B2 | 11/2014 | Minagawa et al. |
| 8,908,073 B2 | 12/2014 | Minagawa et al. |
| 8,922,685 B2 | 12/2014 | Nakata et al. |
| 8,964,079 B2 | 2/2015 | Fukuda et al. |
| 8,976,283 B2 | 3/2015 | Ishiwata et al. |
| 9,041,837 B2 | 5/2015 | Li |
| 9,118,858 B2 | 8/2015 | Totsuka |
| 9,137,472 B2 | 9/2015 | Minagawa et al. |

(Continued)

*Primary Examiner* — Joel W Fosselman
(74) *Attorney, Agent, or Firm* — Muir Patent Law, PLLC

(57) ABSTRACT

An image sensor includes a pixel array including a first shared pixel and a second shared pixel that are adjacent to each other in a row direction. The first shared pixel includes two or more photo diodes in a first row and two or more photo diodes in a second row, and the first shared pixel includes a first floating diffusion region shared by the photo diodes of the first shared pixel. The second shared pixel includes two or more photo diodes in the first row and two or more photo diodes in the second row, and the second shared pixel includes a second floating diffusion region shared by the photo diodes of the second shared pixel.

19 Claims, 17 Drawing Sheets

(56) References Cited

U.S. PATENT DOCUMENTS

| | | |
|---|---|---|
| 9,245,918 B2 | 1/2016 | Ishiwata et al. |
| 9,282,256 B1 | 3/2016 | Shan et al. |
| 9,319,606 B2 | 4/2016 | Nakata et al. |
| 9,357,137 B2 | 5/2016 | Mitsunaga |
| 9,374,544 B2 | 6/2016 | Kurahashi |
| 9,380,230 B2 | 6/2016 | Sawadaishi |
| 9,438,833 B2 | 9/2016 | Ishiwata |
| 9,438,866 B2 | 9/2016 | Solhusvik et al. |
| 9,451,152 B2 | 9/2016 | Li et al. |
| 9,490,281 B2 | 11/2016 | Fukuda et al. |
| 9,491,442 B2 | 11/2016 | Kim |
| 9,525,835 B2 | 12/2016 | Funatsu |
| 9,549,157 B2 | 1/2017 | Shinozaki |
| 9,554,115 B2 | 1/2017 | Agranov et al. |
| 9,578,320 B1 | 2/2017 | Li |
| 9,609,253 B2 | 3/2017 | Masagaki |
| 9,621,834 B2 | 4/2017 | Ui |
| 9,653,499 B2 | 5/2017 | Ishiwata |
| 9,686,486 B2 | 6/2017 | Mauritzson et al. |
| 9,711,553 B2 | 7/2017 | Kim et al. |
| 9,712,765 B2 | 7/2017 | Funatsu et al. |
| 9,736,447 B2 | 8/2017 | Hirota |
| 9,749,521 B2 | 8/2017 | Li et al. |
| 9,749,556 B2 | 8/2017 | Fettig et al. |
| 9,769,409 B2 | 9/2017 | Minagawa et al. |
| 9,786,714 B2 | 10/2017 | Tayanaka |
| 9,787,952 B2 | 10/2017 | Hsu et al. |
| 2012/0305750 A1* | 12/2012 | Barbier ............... H04N 5/335 250/208.1 |
| 2013/0049082 A1* | 2/2013 | Kato ................ H04N 5/3745 257/292 |
| 2014/0055634 A1 | 2/2014 | Tokizaki et al. |
| 2014/0092285 A1 | 4/2014 | Moriyama et al. |
| 2015/0042853 A1 | 2/2015 | Minagawa et al. |
| 2015/0116566 A1 | 4/2015 | Yamamoto |
| 2015/0350583 A1 | 12/2015 | Mauritzson et al. |
| 2016/0248956 A1 | 8/2016 | Mitsunaga |
| 2016/0323494 A1 | 11/2016 | Kimura |
| 2017/0026602 A1 | 1/2017 | Kim |
| 2017/0070694 A1 | 3/2017 | Shinozaki |
| 2017/0094260 A1 | 3/2017 | Agranov et al. |
| 2017/0148836 A1 | 5/2017 | Ishiwata et al. |
| 2017/0161655 A1 | 6/2017 | Masagaki |
| 2017/0170222 A1 | 6/2017 | Toda |
| 2017/0187969 A1 | 6/2017 | Kitamori et al. |
| 2017/0318252 A1 | 11/2017 | Minagawa et al. |

* cited by examiner

PIXEL CIRCUIT AND IMAGE SENSOR INCLUDING THEREOF

CROSS-REFERENCE TO RELATED APPLICATION

This application claims the benefit of Korean Patent Application No. 10-2017-0064388, filed on May 24, 2017, in the Korean Intellectual Property Office, the disclosure of which is incorporated herein in its entirety by reference.

BACKGROUND

The present disclosure relates to an image sensor, and more particularly, to an image sensor including a pixel circuit including a shared pixel.

Image sensors that capture an image and convert it into an electrical signal are used in cameras installed in, for example, vehicles, security devices, and robots as well as in consumer electronics such as digital cameras, cameras for mobile phones, and portable camcorders. Such image sensors may include a pixel array, and each pixel included in the pixel array may include a photo detecting device. The photo detecting device may generate an electrical signal depending on intensity of the absorbed light.

Sizes of pixels of image sensors have been gradually reduced to improve resolution, but image quality needs to be fully guaranteed even with the reduced pixel size. In relation to quality of an image sensor, a dynamic range can be problematic, and when a wide dynamic range (WDR) is provided, both a bright region and a dark region of an image may be expressed in detail.

SUMMARY

The present disclosure provides a pixel circuit which is easily embodied and provides a wide dynamic range under various illumination conditions, and provides an image sensor including the pixel circuit.

According to an aspect of the inventive concept, there is provided an image sensor including a pixel array including a plurality of shared pixels arranged in rows and columns, wherein a first shared pixel and a second shared pixel of the shared pixels are adjacent to each other in a row direction and connected to one selection signal line; and a timing controller configured to control a generation of pixel signals from the first shared pixel and the second shared pixel based on an operation mode of the image sensor, wherein the first shared pixel includes two or more photo diodes in a first row and two or more photo diodes in a second row adjacent to the first row, the photo diodes of the first shared pixel are configured to be exposed to light during a first period of time, and the first shared pixel comprises a first floating diffusion region shared by the photo diodes of the first shared pixel, and the second shared pixel includes two or more photo diodes in the first row and two or more photo diodes in the second row, the photo diodes of the second shared pixel are configured to be exposed to light during a second period of time shorter than the first period of time, and the second shared pixel comprises a second floating diffusion region by the photo diodes of the second shared pixel.

According to another aspect of the inventive concept, there is provided an image sensor including a pixel array including a first shared pixel that includes a first sub-pixel connected to a first row line and a second sub-pixel connected to a second row line and a second shared pixel that includes a third sub-pixel connected to the first row line and a fourth sub-pixel connected to the second row line; and a timing controller configured to control a long-time exposure operation for the first shared pixel and a short-time exposure operation for the second shared pixel such that the pixel array outputs pixel signals based on an operation mode of the image sensor. Each of the first and second sub-pixels has a first color filter sensing a first color and each of the third and fourth sub-pixels has a second color filter sensing a second color different from the first color. Each of the first and second row lines includes at least two transmission control signal lines.

According to another aspect of the inventive concept, there is provided a pixel circuit of an image sensor including a first pixel circuit; and a second pixel circuit adjacent to the first pixel circuit in a row direction, wherein the first pixel circuit includes a first photo diode and a second photo diode that are exposed to light for a long time; and a first transmission transistor and a second transmission transistor respectively connected to the first photo diode and the second photo diode to receive a transmission control signal for controlling a long-time exposure, and the second pixel circuit includes a third photo diode and a fourth photo diode that are exposed for a short time; and a third transmission transistor and a fourth transmission transistor respectively connected to the third photo diode and the fourth photo diode to receive a transmission control signal for controlling a short-time exposure, wherein each of the first transmission transistor and the second transmission transistor receives a transmission control signal having the same signal pattern or a different signal pattern depending on an operation mode to generate a pixel signal, and each of the third transmission transistor and the fourth transmission transistor receives a transmission control signal having the same signal pattern or a different signal pattern depending on an operation mode of the image sensor to generate a pixel signal.

According to still another aspect of the inventive concept, there is provided an image sensor including a pixel array including a plurality of shared pixels arranged in rows and columns. The shared pixels include a first shared pixel and a second shared pixel disposed adjacent to the first shared pixel in a row direction or a column direction. Each of the first and second shared pixel includes a first set of photo diodes disposed in a first row, a second set of photo diodes disposed in a second row adjacent to the first row, and a floating diffusion region shared by transmission transistors, each of the transmission transistors connected to a corresponding photo diode of the first and second sets of photo diodes. Each photo diode of the first shared pixel has a first color filter sensing a first color and each photo diode of the second shared pixel has a second color filter sensing a second color different from the first color.

BRIEF DESCRIPTION OF THE DRAWINGS

Embodiments of the present disclosure will be more clearly understood from the following detailed description taken in conjunction with the accompanying drawings in which.

DETAILED DESCRIPTION

Figure 1:
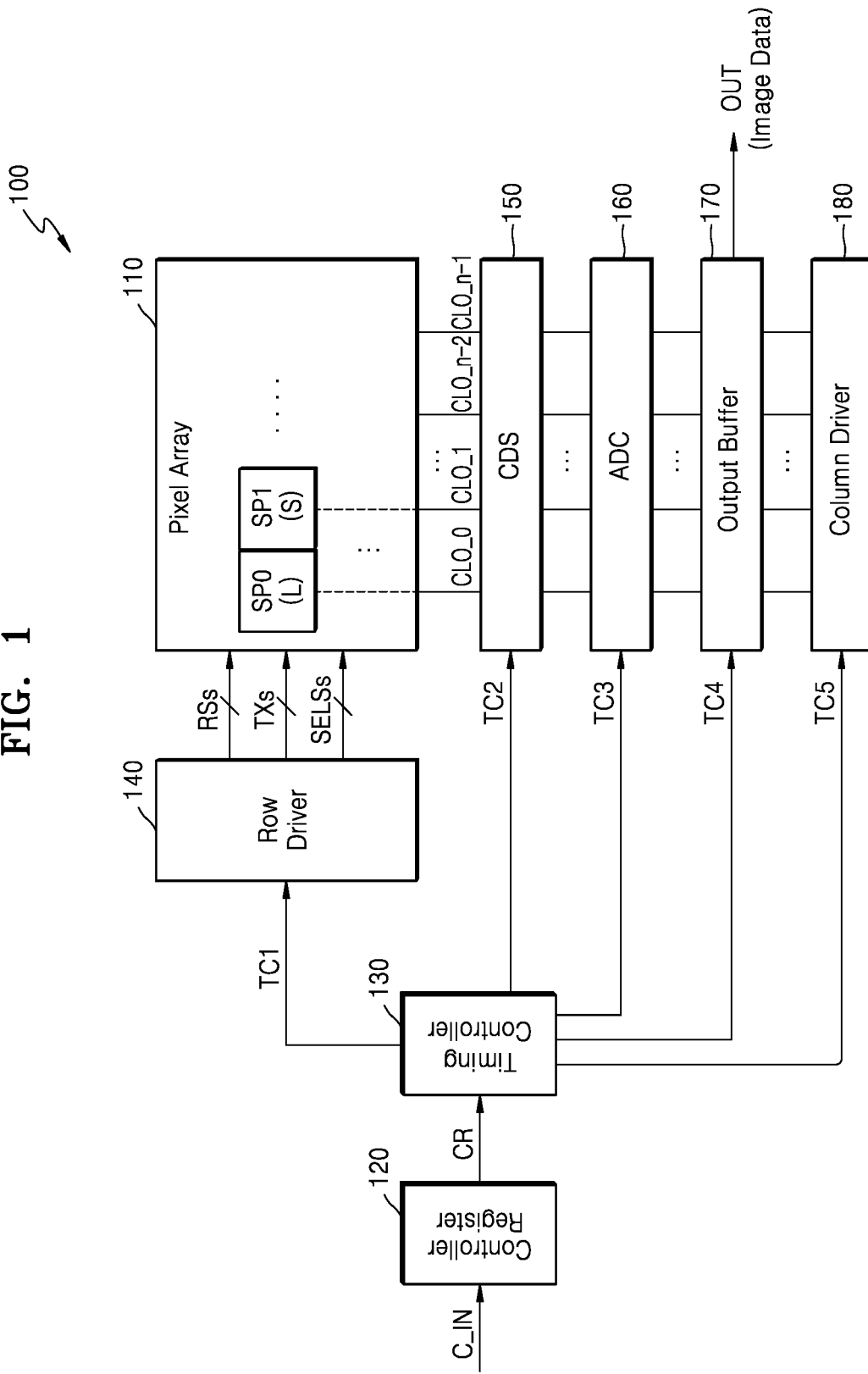
FIG. 1 illustrates a block diagram of an image sensor according to an example embodiment of the inventive concept.

It will be understood that, although the terms first, second, third etc. may be used herein to describe various elements, these elements should not be limited by these terms. Unless indicated otherwise, these terms are generally used to distinguish one element from another. Thus, a first element discussed below in one section of the specification could be termed a second element in a different section of the specification without departing from the teachings of the present disclosure. Also, terms such as "first" and "second" may be used in the claims to name an element of the claim, even thought that particular name is not used to describe in connection with the element in the specification.

The embodiments are described, and illustrated in the drawings, in terms of functional blocks and/or units. These blocks and/or units may be physically implemented by electronic (or optical) circuits such as logic circuits, discrete components, microprocessors, hard-wired circuits, memory elements, wiring connections, and the like, which may be formed together in a single integrated circuit (e.g., as a single semiconductor chip) or as separate integrated circuits and/or discrete components (e.g., several semiconductor chips wired together on a printed circuit board) using semiconductor fabrication techniques and/or other manufacturing technologies. These blocks and/or units may be implemented by a processor microprocessor, a controller, a CPU, a GPU) or processors that are programmed using software (e.g., microcode) to perform various functions discussed herein. Each block and/or unit may be implemented by dedicated hardware, or as a combination of dedicated hardware to perform some functions and a processor to perform other functions. Also, each block and/or unit of the embodiments may be embodied by physically separate circuits and need not be formed as a single integrated circuit.

FIG. 1 illustrates a block diagram of an image sensor according to an example embodiment of the inventive concept.

Referring to FIG. 1, an image sensor 100 may include a pixel array 110, a control register 120, a timing controller 130, a row driver 140, a correlated-double sampling (hereinafter, CDS) 150, an analog-digital converter (hereinafter, ADC) 160, an output buffer 170, and a column driver 180. The pixel array 110 may include a plurality of shared pixels arranged in rows and columns. The plurality of shared pixels may include a first shared pixel SP0 and a second shared pixel SP1. Each of the shared pixels may include a plurality of sub-pixels. The second shared pixel SP1 may be disposed adjacent to the first shared pixel SP0 in a row direction.

The first shared pixel SP0 may include two or more photo diodes exposed to light for a long time to generate a predetermined pixel signal and a first floating diffusion region in which photo diodes of the first shared pixel SP0 are shared, and the second shared pixel SP1 may include two or more photo diodes exposed to light for a short time to generate a predetermined pixel signal and a second floating diffusion region in which photo diodes of the second shared pixel SP1 are shared. Hereinafter, the term "long time" may be referred to a period of time longer than that of "short time." For example, a period of time of "long time" may be a period of time of "short time" by n times, n is a positive integer greater than 1. The exposure to light may be based on a timing for accumulating photocharge for each pixel or sub-pixel. As an example, when an image corresponding to a frame is captured, an amount of photocharge accumulated in each of photo diodes of the first shared pixel SP0 may be greater than an amount of photocharge accumulated in each of photo diodes of the second shared pixel SP1. In addition, spectral sensitivities of the first shared pixel SP0 and the second shared pixel SP1 may differ. For example, the first shared pixel SP0 may sense a blue color, and the second shared pixel SP1 may sense a green color. A configuration of the first shared pixel SP0 or the second shared pixel SP1 may apply to shared pixels included in the pixel array 110.

Each of the shared pixels of the pixel array 110 may output a pixel signal to the CDS 150 though first to n−1th column output line CLO_0 to CLO_n−1. For example, the first shared pixel SP0 may be connected to the first column output line CLO_0 and then provide a pixel signal to the CDS 150 through the first column output line CLO_0. The second shared pixel SP1 may be connected to the second column output line CLO_1 and then provide a pixel signal to the CDS 150 the second column output line CLO_1.

The image sensor 100 may receive a control input signal C_IN, and generate a data output signal OUT by detecting light through the pixel array 110. The image sensor 100 may support various operation modes. The image sensor 100 may support a low-resolution operation mode, a high-resolution operation mode, and the like. For example, the image sensor 100 may be set as a low-resolution operation mode in a low illumination condition in which an exterior illumination condition is equal to or less than a threshold or in response to an external command, and may generate the data output signal OUT based on the low-resolution operation mode. As an embodiment, when the image sensor 100 is in the low-resolution operation mode, photo diodes of the first shared pixel SP0 may start to accumulate photocharge at a first time, and photo diodes of the second shared pixel SP1 may start to accumulate photocharge at a second time. Next, the photocharge accumulated in the first shared pixel SP0 and photocharge accumulated in the second shared pixel SP1 may be respectively delivered to the first floating diffusion region and the second floating diffusion region at a third time. Then, in a predetermined read period, a first pixel signal generated in the first shared pixel SP0 may be output through the first column output line CLO_0, and a second pixel signal generated in the second shared pixel SP1 may be output through the second column output line CLO_1.

As described above, in the low-resolution operation mode, as the image sensor 100 generates a pixel signal for each unit of shared pixels, the image sensor 100 may operate to secure a wide dynamic range according to a low illumination condition. Hereinafter, a photo diode of a shared pixel accumulating photocharge refers to a sub-pixel of a shared pixel accumulating photocharge.

The image sensor 100 may be set as a high-resolution operation mode in a high illumination condition in which an exterior illumination condition is equal to or greater than a threshold or in response to an external command, and may generate the data output signal OUT based on the high-resolution operation mode. Hereinafter, to describe the high-resolution operation mode of the image sensor 100, it is assumed that the first shared pixel SP0 includes a first photo diode corresponding to a first sub-pixel and a second photo diode corresponding to a second sub-pixel, and the second shared pixel SP1 includes a third photo diode corresponding to a third sub-pixel and a fourth photo diode corresponding to a fourth sub-pixel. As an embodiment, when the image sensor 100 is in the high-resolution operation mode, for the first photo diode and the second photo diode of the first shared pixel SP0, each timing of starting to accumulate photocharge may differ, and for the third photo diode and the fourth photo diode of the second shared pixel SP1, each timing of starting to accumulate photocharge may differ. Then, photocharge accumulated in the first photo diode and photocharge accumulated in the third photo diode may be respectively delivered to the first floating diffusion region and the second floating diffusion region at the same time, and photocharge accumulated in the second photo diode and photocharge accumulated in the fourth photo diode may be respectively delivered to the first floating diffusion region and the second floating diffusion region at the same time. Then, in a first read period, a pixel signal corresponding to photocharge accumulated in the first photo diode may be output through the first column output line CLO_0 connected to the first shared pixel SP0, and a pixel signal corresponding to photocharge accumulated in the third photo diode may be output through the second column output line CLO_1 connected to the second shared pixel SP1. In a second read period, a pixel signal corresponding to photocharge accumulated in the second photo diode may be output through the first column output line CLO_0 connected to the first shared pixel SP0, and a pixel signal corresponding to photocharge accumulated in the fourth photo diode may be output through the second column output line CLO_1 connected to the second shared pixel SP1.

As described above, in the high-resolution operation mode, the image sensor 100 may generate a pixel signal as a sub-pixel unit constituting a shared pixel and thus, may operate to secure a wide dynamic range according to a high illumination condition.

The control register 120 may include a plurality of registers storing values according to the control input signal C_IN. For example, the control input signal C_IN may include information on an operation mode of the image sensor 100, and the control register 120 may include a register storing a value indicating an operation mode of the image sensor 100. The control register 120 may provide a control register signal CR including values stored in the control register 120 to the timing controller 130. Although not illustrated in FIG. 1, the control register 120 may provide a separate control register signal to each of the row driver 140 and the column driver 180.

The timing controller 130 may control an operation timing of the image sensor 100. The timing controller 130 may control an operation timing of the image sensor 100 based on the control register signal CR received from the control register 120. As an example, the timing controller 130 may set a time needed to finish a read for output signals output from shared pixels included in the pixel array 110 depending on an operation mode such as the low-resolution operation mode and the high-resolution operation mode, and generate first to fifth timing signals TC1 to TC5 according to the set time. The timing controller 130 may provide the first to fifth timing signals TC1 to TC5 to the row driver 140, the CDS 150, the ADC 160, the output buffer 170, and the column driver 180. Each of the row driver 140, the CDS 150, the ADC 160, the output buffer 170, and the column driver 180 may operate in response to the received first to fifth timing signals TC1 to TC5. For example, the timing controller 130 may control an operation of generating a pixel signal from the pixel array 110 based on various operation modes. However, the control operation of the timing controller 130 described with reference to FIG. 1 is an example and is not limited thereto. The control operation may have various embodiments.

The row driver 140 may generate reset control signals, transmission control signals, and selection signals RSs, TXs, and SELSs for controlling the pixel array 110. As illustrated in FIG. 1, the row driver 140 may provide, in response to the first timing signal TC1, the reset control signals RSs, the transmission control signals TXs, and the selection signals SELSs to a plurality of pixels included in the pixel array 110. The row driver 140 may determine activation and deactivation timings of the reset control signals RSs, the transmission control signals TXs, the selection signals SELSs based on various operation modes (e.g., the low-resolution operation mode or the high-resolution operation mode).

The CDS 150 may sequentially perform sampling and holding of a reference signal and a pixel signal provided from each of the first to n–1th column output lines CLO_0 to CLO_n–1 from the pixel array 110. The CDS 150 may transmit, in response to the second timing signal TC2, a reference signal and a pixel signal of each of the first to n–1th column output lines CLO_0 to CLO_n–1 as a correlated-double sampling signal to the ADC 160. The ADC 160 may convert a correlated-double sampling signal of each of the first to n–1th column output lines CLO_0 to CLO_n–1, output from the CDS 150, into a digital signal to output to the output buffer 170 in response to the third timing signal TC3. The output buffer 170 may capture and output image data of each column output line, provided from the ADC 160, in response to the fourth timing signal TC4. The output buffer 170 may operate as an interface for compensating a difference in transmission speeds between the image sensor 100 and another device connected to the image sensor 100. The column driver 180 may select a column output line of the output buffer 170 in response to the fifth timing signal TC5, and generate control signals to output the data output signal OUT including image data corresponding to the selected column output line from the output buffer 170.

Figure 2:
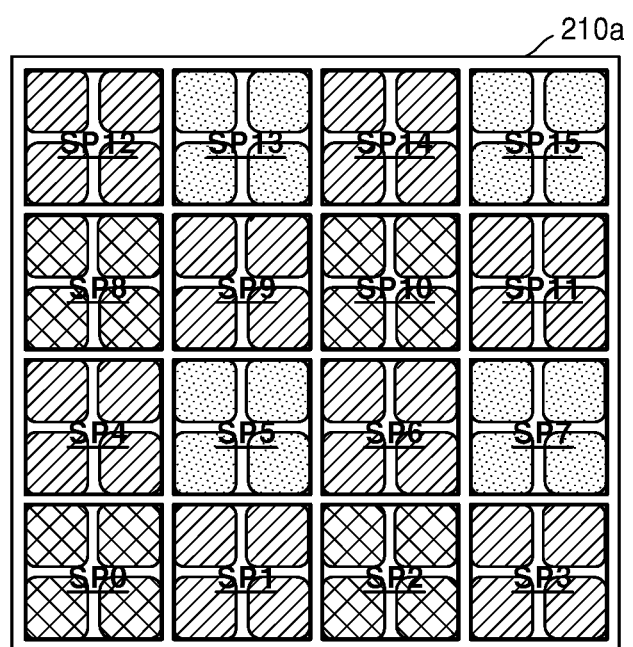
FIG. 2 illustrates a view showing an embodiment of a pixel array of FIG. 1 according to example embodiments.
Figure 2:
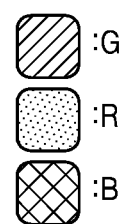

FIG. 2 illustrates a view showing an embodiment of a pixel array of FIG. 1 according to example embodiments.

Referring to FIG. 2, a pixel array 210a may include a plurality of pixels disposed along a plurality of rows and columns. For example, a shared pixel defined as a unit including pixels disposed in two rows adjacent to each other and two columns adjacent to each other may include four sub-pixels (e.g., 2×2 pixels). For example, the shared pixel may include four photo diodes respectively corresponding to four sub-pixels. For example, a first set of pixels (e.g., two sub-pixels) of a first shared pixel may be disposed in a first row and a second set of pixels (e.g., two other sub-pixels) of the first shared pixel may be disposed in a second row adjacent to the first row. So, the first shared pixel is disposed in two rows and two columns. As illustrated in FIG. 2, the pixel array 210a may include first to sixteenth shared pixels SP0 to SP15. The pixel array 210a may include a color filter so that the first to sixteenth shared pixels SP0 to SP15 may sense various colors. As an example, a color filter may include filters sensing red (R), green (G), and blue (B), and the first to sixteenth shared pixels SP0 to SP15 as one unit may include sub-pixels in which the same color filter is disposed. For example, the first shared pixel SP0, the third shared pixel SP2, the ninth shared pixel SP8 and the eleventh shared pixel SP10 may include sub-pixels including a blue (B) color filter, the second shared pixel SP1, the fourth shared pixel SP3, the fifth shared pixel SP4, the seventh shared pixel SP6, the tenth shared pixel SP9, the twelfth shared pixel SP11, the thirteenth shared pixel SP12 and the fifteenth shared pixel SP14 may include sub-pixels including a green (G) color filter, and the sixth shared pixel SP5, the eighth shared pixel SP7, the fourteenth shared pixel SP13 and the sixteenth shared pixel SP15 may include sub-pixels including a red (R) color filter. Also, a group including the first shared pixel SP0, the second shared pixel SP1, the fifth shared pixel SP4 and the sixth shared pixel SP5, a group including the third shared pixel SP2, the fourth shared pixel SP3, the seventh shared pixel SP6 and the eighth shared pixel SP7, a group including the ninth shared pixel SP8, the tenth shared pixel SP9, the thirteenth shared pixel SP12 and the fourteenth shared pixel SP13, and a group including the eleventh shared pixel SP10, the twelfth shared pixel SP11, the fifteenth shared pixel SP14 and the sixteenth shared pixel SP15 may be each disposed to correspond to a Bayer pattern in the pixel array 210a. In example embodiments, the pixel array 201a may include a first color pattern, for example, B, G, B, and G in a first row, and a second color pattern, for example, G, R, G, and R in a second row adjacent to the first row. The pixel array 201a may also include a third color pattern, for example, G, B, G, and B in a first column, and a fourth color pattern, for example, R, G, R, and G in a second column adjacent to the first column.

However, the above is an embodiment, and the pixel array 210a according to different embodiments of the inventive concept may include various types of color filters. For example, a color filter may include filters for sensing yellow, cyan, magenta and green colors. Alternatively, a color filter may include filters for sensing red, green, blue and white colors. In addition, the pixel array 210a may include more shared pixels than described, and a disposition of each of the first to sixteenth shared pixels SP0 to SP15 may be embodied in various ways and the inventive concept is not limited to FIG. 2.

Figure 3A:
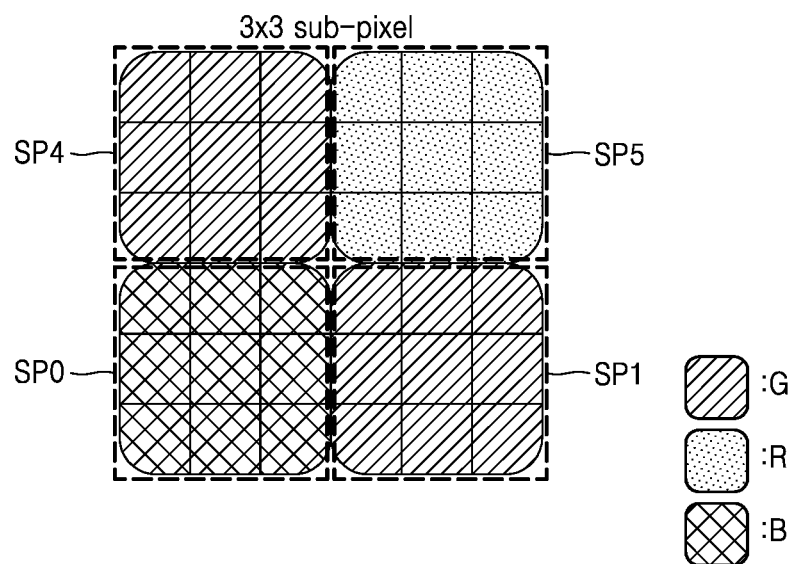
FIGS. 3A and 3B illustrate the shared pixel of FIG. 2 according to other example embodiments.
Figure 3B:
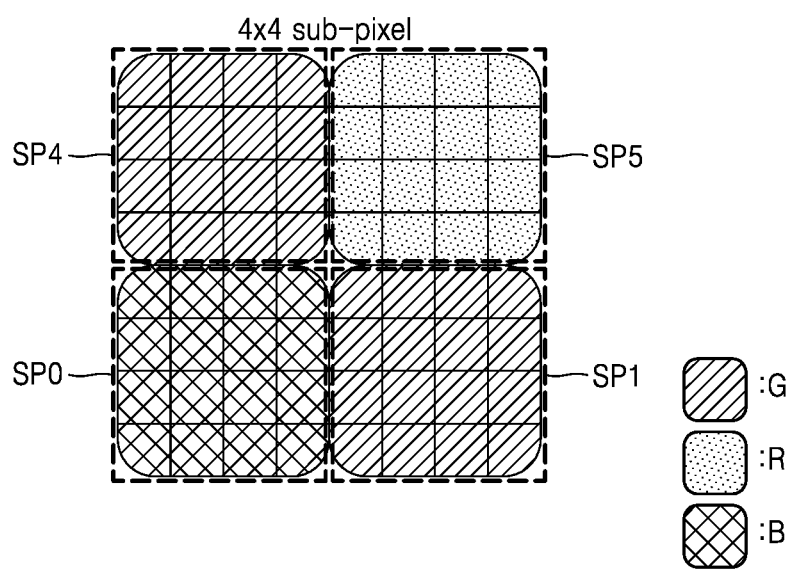

FIGS. 3A and 3B illustrate the shared pixel of FIG. 2 according to other example embodiments. FIGS. 3A and 3B illustrate example embodiments in which one shared pixel includes sub-pixels in various numbers.

Referring to FIG. 3A, each of the first, second, fifth, and sixth shared pixels SP0, SP1, SP4, and SP5 as a unit may include nine sub-pixels. In the same manner as described in FIG. 2, the first shared pixel SP0 may include nine sub-pixels including a blue (B) color filter, and the second shared pixel SP1 and the fifth shared pixel SP4 may each include nine sub-pixels including a green (G) color filter. The sixth shared pixel SP5 may include nine sub-pixels including a red (R) color filter.

As another example, referring to FIG. 3B, each of the first, second, fifth, and sixth shared pixels SP0, SP1, SP4, and SP5 as a unit may include sixteen sub-pixels. In the same manner as described in FIG. 2, the first shared pixel SP0 may include sixteen sub-pixels including a blue (B) color filter, and the second shared pixel SP1 and the fifth shared pixel SP4 may each include sixteen sub-pixels including a green (G) color filter. The sixth shared pixel SP5 may include sixteen sub-pixels including a red (R) color filter.

Figure 4A:
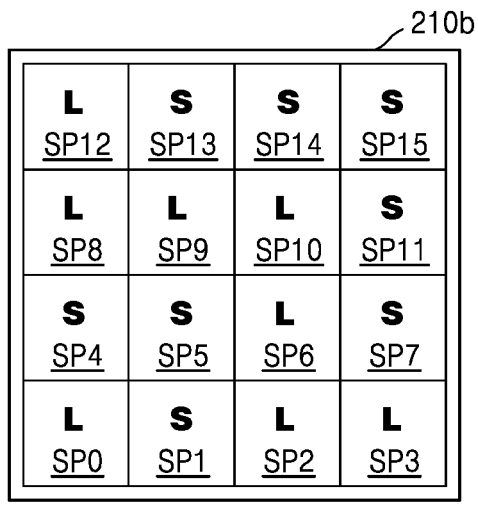
FIGS. 4A and 4B illustrate views of the pixel array of FIG. 1, including shared pixels disposed according to an exposure time to generate image data with high sensitivity, according to example embodiments.
Figure 4B:
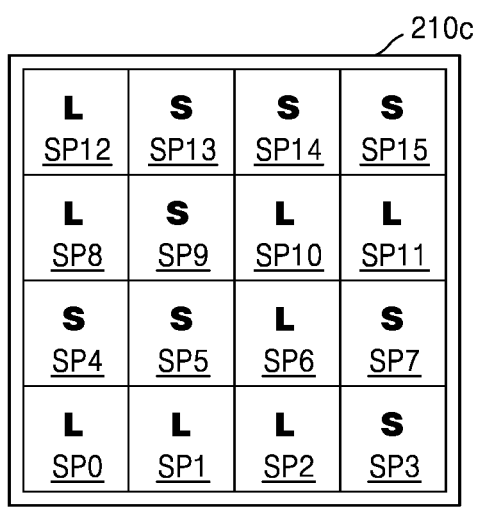

FIGS. 4A and 4B illustrate views of the pixel array of FIG. 1, including shared pixels disposed according to an exposure time to generate image data with high sensitivity, according to example embodiments.

Referring to FIG. 4A, a pixel array 210b may include shared pixels exposed for a long time and shared pixels exposed for a short time. The shared pixel exposed for a long time is a shared pixel for generating a pixel signal by being continuously exposed to light (e.g., accumulating photocharge) for a constant exposure period, and the shared pixel exposed for a short time is a shared pixel for generating a pixel signal by being intermittently exposed to light for a constant exposure period. The shared pixel exposed for a long time may include a plurality of photo diodes for being exposed to light (e.g., accumulating photocharge) for a long time, and the shared pixel exposed for a short time may include a plurality of photo diodes for being exposed to light for a short time. Hereinafter, it is assumed that a shared pixel marked with L is the shared pixel exposed for a long time, and a shared pixel marked with S is the shared pixel exposed for a short time. As an embodiment, as illustrated in FIG. 4A, the first shared pixel SP0, the third shared pixel SP2, the fourth shared pixel SP3, the seventh shared pixel SP6, the ninth to eleventh shared pixels SP8 to SP10, and the thirteenth shared pixel SP12 may be the shared pixels exposed for a long time, and other shared pixels SP1, SP4, SP5, SP7, SP11, and SP13 to SP15 may be the shared pixels exposed for a short time.

FIG. 4B illustrates, unlike FIG. 4A, a view of an embodiment in which the shared pixel exposed for a long time and the shared pixel exposed for a short time are disposed. As illustrated in FIG. 4B, a pixel array 210c may include shared pixels exposed for a long time and shared pixels exposed for a short time. In addition, the first to third shared pixels SP0 to SP2, the seventh shared pixel SP6, the ninth shared pixel SP8, the eleventh shared pixel SP10, the twelfth shared pixel SP11, and the thirteenth shared pixel SP12 may be the shared pixels exposed for a long time, and the other shared pixels SP3, SP4, SP5, SP7, SP9, and SP13 to SP15 may be the shared pixels exposed for a short time. However, the pixel arrays 210b and 210c illustrated in FIGS. 4A and 4B are example embodiments, and thus, the inventive concept is not limited thereto. A pixel array in which the shared pixel exposed for a long time and the shared pixel exposed for a short time are disposed by utilizing one or more disposition methods may be embodied. Furthermore, in the imaging within one frame, the pixel arrays 210b and 210c may perform the imaging by using a spatially varying exposure (SVE) method in which an exposure period is regularly changed in one frame and may be embodied to have a wide dynamic range effect by using a signal procession technology.

Figure 5A:
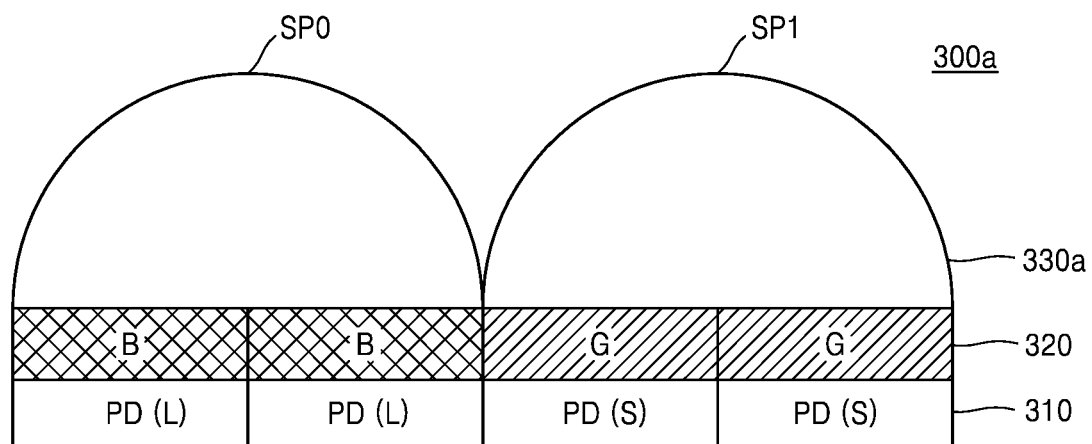
FIGS. 5A and 5B illustrate views showing an image sensor according to example embodiments of the inventive concept.
Figure 5B:
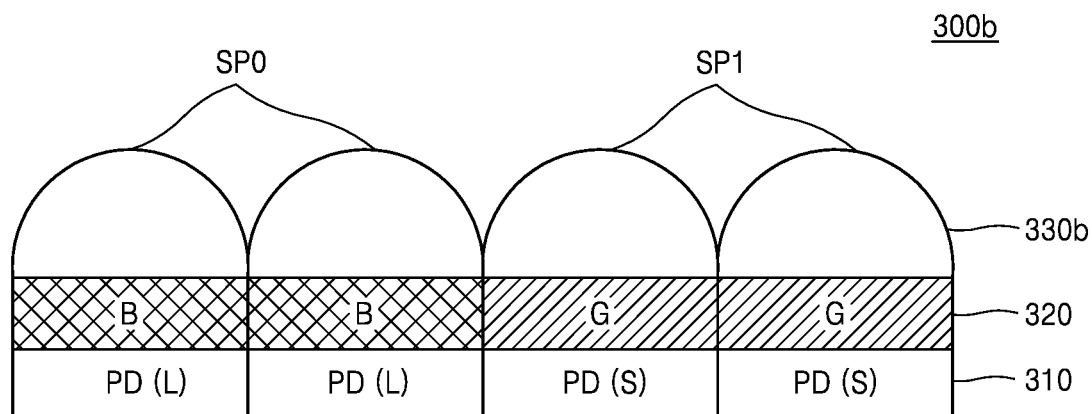

FIGS. 5A and 5B illustrate views showing an image sensor according to example embodiments of the inventive concept. In FIGS. 5A and 5B, a blue sub-pixel and a green sub-pixel are illustrated as an example from among a plurality of sub-pixels included in an image sensor. In addition, although as shared pixels including 2×2 sub-pixels are illustrated, and FIGS. 5A and 5B illustrate cross-sectional views of some portions of image sensors, and thus two sub-pixels for a shared pixel are illustrated.

As illustrated in FIGS. 5A and 5B, image sensors 300a and 300b may include a plurality of photo diodes 310, a plurality of blue and green color filters 320, and a plurality of micro lenses 330a and 330b. In addition, although not illustrated in FIGS. 5A and 5B, a floating diffusion region (not shown) receiving photocharge from the photo diodes 310 may be formed in a substrate in which the photo diodes 310 are disposed.

As an embodiment, a shared pixel may include four sub-pixels. Although only two sub-pixels corresponding to a shared pixel are illustrated in FIGS. 5A and 5B, the first shared pixel SP0 may substantially include four sub-pixels generating a pixel signal with high sensitivity. The first shared pixel SP0 may include the blue (B) color filters 320 as illustrated in FIG. 2 or the like. For example, the first shared pixel SP0 may include photo diodes PD(L) corresponding to sub-pixels. The second sub-pixel SP1 may include four sub-pixels generating a pixel signal with low sensitivity. The second shared pixel SP1 may include the green (G) color filters 320 as illustrated in FIG. 2 or the like. For example, the second shared pixel SP1 may include photo diodes PD(S) corresponding to sub-pixels.

As illustrated in FIG. 5A, each of the micro lenses 330a may be disposed to correspond to the first and second shared pixels SP0 and SP1. For example, as a micro lens is disposed to correspond to a plurality of sub-pixels, information on a phase-difference between sub-pixels is generated to obtain information on depth, and thus, an auto focusing function may be performed.

As another embodiment, as illustrated in FIG. 5B, the image sensor 300b may include micro lenses 330b disposed to respectively correspond to a plurality of sub-pixels. In addition, sizes of a long-time exposed photo diode PD(L) of the first shared pixel SP0 and a short-time exposed photo diode PD(S) of the second shared pixel SP1 may be the same, and thus, a process of manufacturing the micro lenses 330b disposed to respectively correspond to the sub-pixels may be relatively easy. Furthermore, when the sizes of the micro lenses are different from each other, a pixel having a lens of a big size may affect a pixel having a lens of a small size thereby causing a shading, but the inventive concept may reduce the likelihood of the occurrence of a shading.

Figure 6:
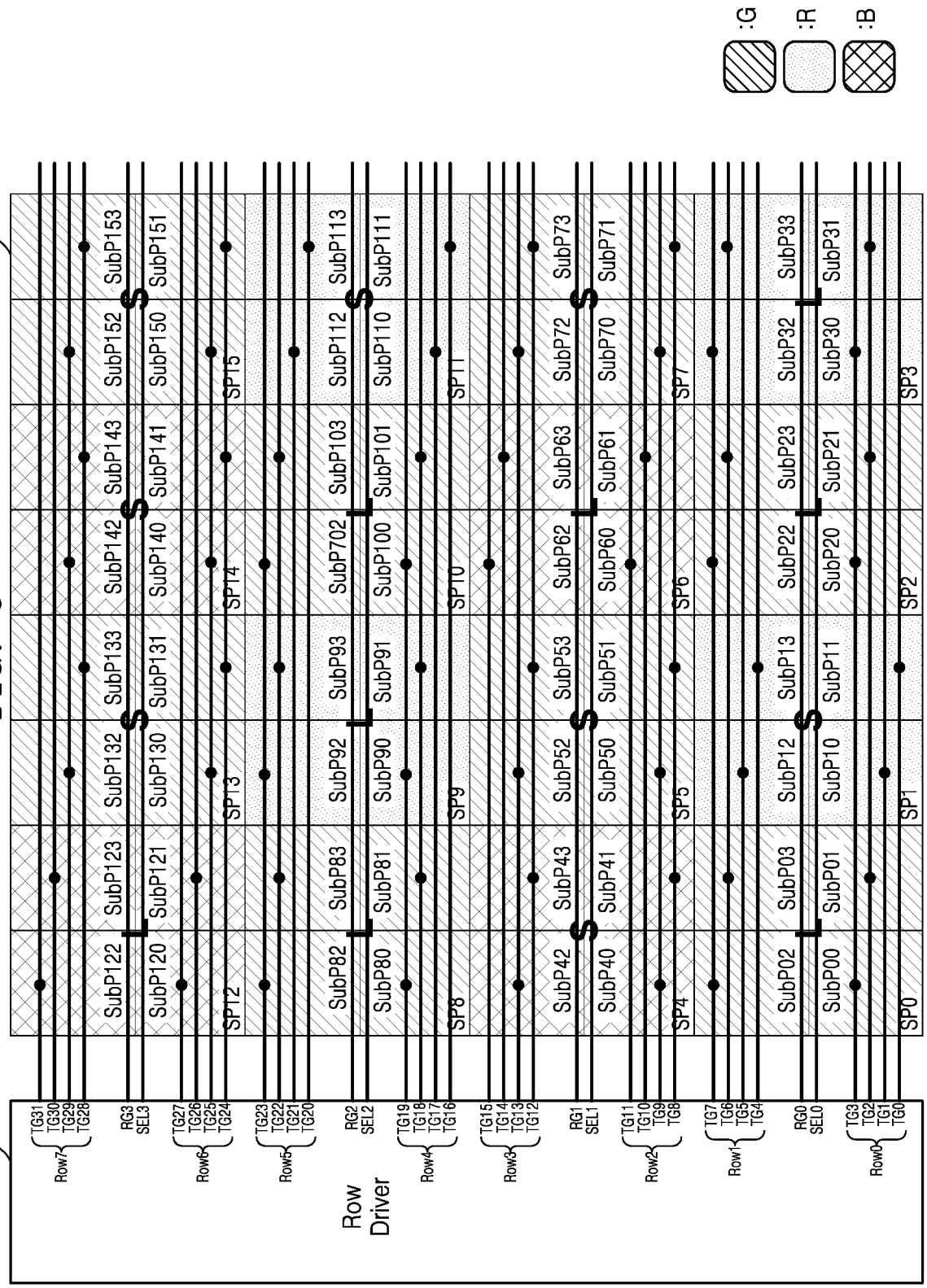
FIG. 6 illustrates a view showing a connection between a row driver and a pixel array of FIG. 1 in detail, according to example embodiments.

FIG. 6 illustrates a view showing a connection between a row driver and a pixel array of FIG. 1 in detail, according to example embodiments.

Referring to FIG. 6, a pixel array 410 may include first to sixteenth shared pixels SP0 to SP15. In the pixel array 410, a shared pixel exposed for a long time L and a shared pixel exposed for a short time S may be disposed according to the embodiment described with reference to FIG. 4A. The first to sixteenth shared pixels SP0 to SP15 may each include four sub-pixels SubP00 to SubP153. Hereinafter, as an embodiment, a shared pixel including 2×2 sub-pixels will be mainly described as illustrated in FIG. 6.

The pixel array 410 may be connected to the row driver 440 through transmission control signal lines TG0 to TG31, reset signal lines RG0 to RG3, and selection signal lines SEL0 to SEL3. The first to fourth shared pixels SP0 to SP3 may share the first reset signal line RG0 and the first selection signal line SEL0, the fifth to eighth shared pixel SP4 to SP7 may be connected to the second reset signal line RG1 and the second selection signal line SEL1, the ninth to twelfth shared pixels SP8 to SP11 may be connected the third reset signal line RG2 and the third selection signal line SEL2, and the thirteenth to sixteenth shared pixels SP12 to SP15 may be connected to the fourth reset signal line RG3 and the fourth selection signal line SEL3. Row lines Row0 to Row7 may respectively include four transmission control signal lines TG0 to TG3, TG4 to TG7, TG8 to TG11, TG12 to TG15, TG16 to TG19, TG20 to TG23, TG24 to TG27, and TG28 to TG31. As an example, the first to fourth shared pixels SP0 to SP3 may be connected to the first and second row lines Row0 and Row1, the first reset signal line RG0, and the first selection signal line SEL0.

In example embodiments, a first set of pixels (e.g., two sub-pixels) of each of the first to fourth shared pixels SP0 to SP3 may correspond to the four transmission control signal lines TG0 to TG3 of the first row line Row0, and a second set of pixels (e.g., other two sub-pixels) of each of the first to fourth shared pixels SP0 to SP3 may correspond to the four transmission control signal lines TG4 to TG7 of the second row line Row1.

The row lines Row0 to Row7 may respectively include the transmission control signal lines TG0 and TG1, TG4 and TG5, TG8 and TG9, TG12 and TG13, TG16 and TG17, TG20 and TG21, TG24 and TG25, and TG28 and TG29 for providing a control signal for a short-time exposure to light, and may also respectively include the transmission control signal lines TG2 and TG3, TG6 and TG7, TG10 and TG11, TG14 and TG15, TG18 and TG19, TG22 and TG23, TG26 and TG27, and TG30 and TG31 for providing a control signal of a long-time exposure to light. For example, the first row line Row0 may include the first and second transmission control signal lines TG0 and TG1 for providing a control signal of a short-time exposure to light, and the third and fourth transmission control signal lines TG2 and TG3 for providing a control signal of a long-time exposure to light.

The first shared pixel SP0 may include sub-pixels SubP00 to SubP03 each including a photo diode for a long-time exposure to light as the shared pixel exposed for a long time L. For a long-time exposure control, the sub-pixel SubP00 may be connected to the fourth transmission control signal line TG3, the sub-pixel SubP01 may be connected to the third transmission control signal line TG2, the sub-pixel SubP02 may be connected to the eighth transmission control signal line TG7, and the sub-pixel SubP03 may be connected to the seventh transmission control signal line TG6. The second shared pixel SP1 may include sub-pixels SubP10 to SubP13 each including a photo diode for a short-time exposure to light as the shared pixel exposed for a short time S. For controlling a short-time exposure to light, the sub-pixel SubP10 may be connected to the second transmission control signal line TG1, the sub-pixel SubP11 may be connected to the first transmission control signal line TG0, the sub-pixel SubP12 may be connected to the sixth transmission control signal line TG5, and the sub-pixel SubP13 may be connected to the fifth transmission control signal line TG4. A configuration of the first shared pixel SP0 or the second shared pixel SP1 as described above may be applied to other third to sixteenth shared pixels SP2 to SP15.

Taking into account the configuration of the pixel array 410 and the row driver 440 above, an operation for generating image data based on the high-resolution operation mode or the low-resolution operation mode may be flexibly performed. However, the configuration illustrated in FIG. 6 is an example embodiment, and the inventive concept is not limited thereto. Various configurations that allow a specific operation of an image sensor described below to be performed may be used.

Figure 7:
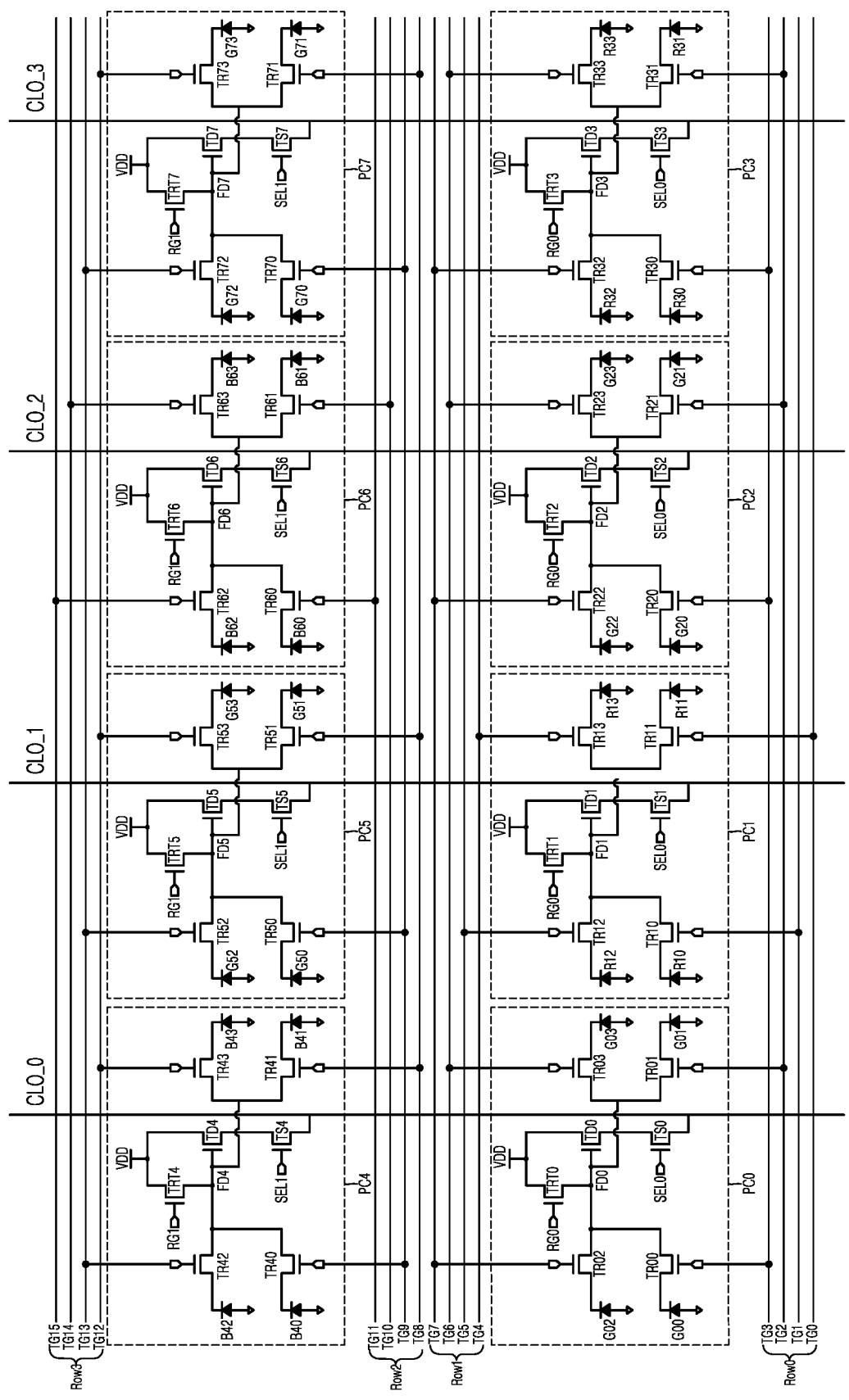
FIG. 7 illustrates a circuit diagram corresponding to some shared pixels of the pixel array of FIG. 6 according to example embodiments.

FIG. 7 illustrates a circuit diagram corresponding to some shared pixels of the pixel array of FIG. 6 according to example embodiments. FIG. 7 illustrates a circuit diagram showing the first to eighth shared pixels SP0 to SP7 connected to the first to sixteenth transmission control signal lines TG0 to TG15. Referring to FIG. 6, a first pixel circuit PC0 to an eighth pixel circuit PC7 may respectively correspond to the first shared pixel SP0 to the eighth shared pixel SP7 of FIG. 6. The first pixel circuit PC0 may include one or more photo diodes G00 to G03 exposed to light for a long time and sensing a green (G) color. The first pixel circuit PC0 may include the transmission transistors TR00 to TR03 for controlling a transmission of photocharge accumulated in the photo diodes G00 to G03. The transmission transistor TR00 may be connected to the fourth transmission control signal line TG3, the transmission transistor TR01 may be connected to the third transmission control signal line TG2, the transmission transistor TR02 may be connected to the eighth transmission control signal line TG7, and the transmission transistor TR03 may be connected to the seventh transmission control signal line TG6. Through the aforementioned connection, a long-time exposure control for the first pixel circuit PC0, based on the transmission control signals controlling accumulated photocharge may be possible. However, this is merely an example embodiment, and thus, the inventive concept is not limited thereto. The photo diodes of the first pixel circuit PC0 and the transmission transistors may be disposed in various numbers. In addition, the first pixel circuit PC0 may further include a first floating diffusion region FD0, a first driving transistor TD0, a first reset transistor TRT0 and a first selection transistor TS0. The photo diodes G00 to G03 may share the first floating diffusion region FD0.

A second pixel circuit PC1 may include one or more photo diodes R10 to R13 exposed to light for a short time and sensing red (R) color. The second pixel circuit PC1 may include the transmission transistors TR10 to TR13 for controlling a transmission of photocharge accumulated in the photo diodes R10 to R13. The transmission transistor TR10 may be connected to the second transmission control signal line TG1, transmission transistor TR11 may be connected to the first transmission control signal line TG0, transmission transistor TR12 may be connected to the sixth transmission control signal line TG5, and transmission transistor TR13 may be connected to the fifth transmission control signal line TG4. Through the aforementioned connection, a control for the second pixel circuit PC1 to be exposed to light for a short time, based on the transmission control signals controlling accumulated photocharge may be possible. In addition, the second pixel circuit PC1 may further include a second floating diffusion region FD1, a second driving transistor TD1, a second reset transistor TRT1, and a second selection transistor TS1. The photo diodes R10 to R13 may share the second floating diffusion region FD1.

A configuration of the first pixel circuit PC0 or the second pixel circuit PC1 is applied to the third to eighth pixel circuits PC2 to PC7, and thus, detailed descriptions thereof will be omitted.

The first pixel circuit PC0 and the fifth pixel circuit PC4 may be connected to the first column output line CLO_0, the second pixel circuit PC1 and the sixth pixel circuit PC5 may be connected to the second column output line CLO_1, the third pixel circuit PC2 and the seventh pixel circuit PC6 may be connected to the third column output line CLO_2, and the fourth pixel circuit PC3 and the eighth pixel circuit PC7 may be connected to the fourth column output line CLO_3. Hereinafter, a detailed control operation of a timing controller for the pixel circuits above will be described.

Figure 8A:
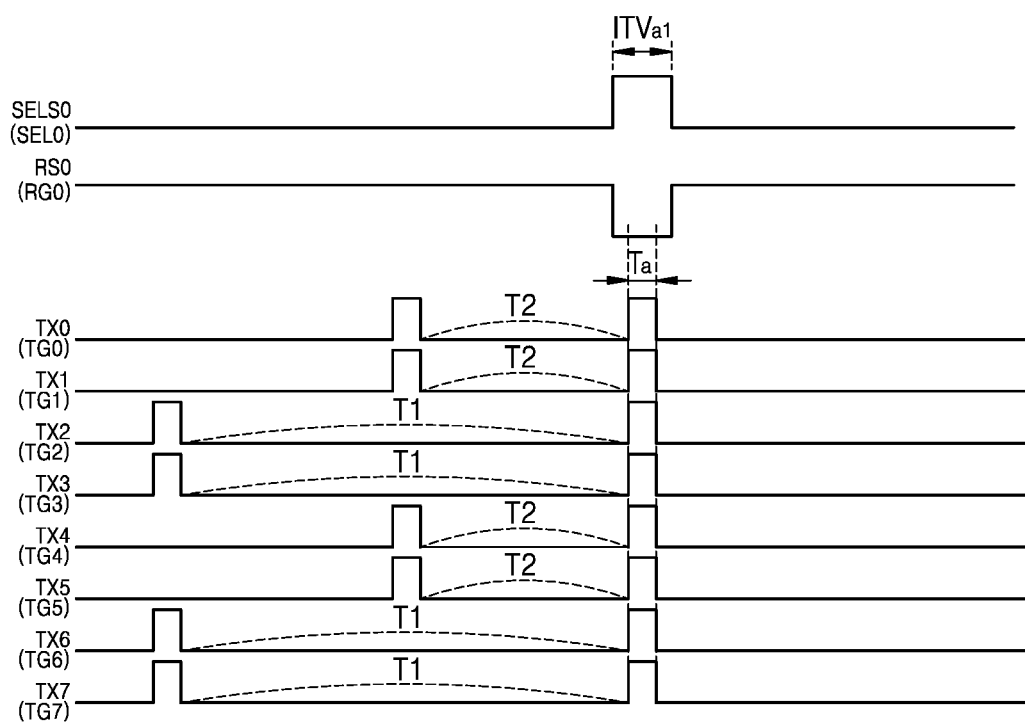
FIGS. 8A and 8B illustrate views showing a control method of a timing controller for a pixel circuit generating a pixel signal in a low-resolution operation mode according to example embodiments.
Figure 8B:
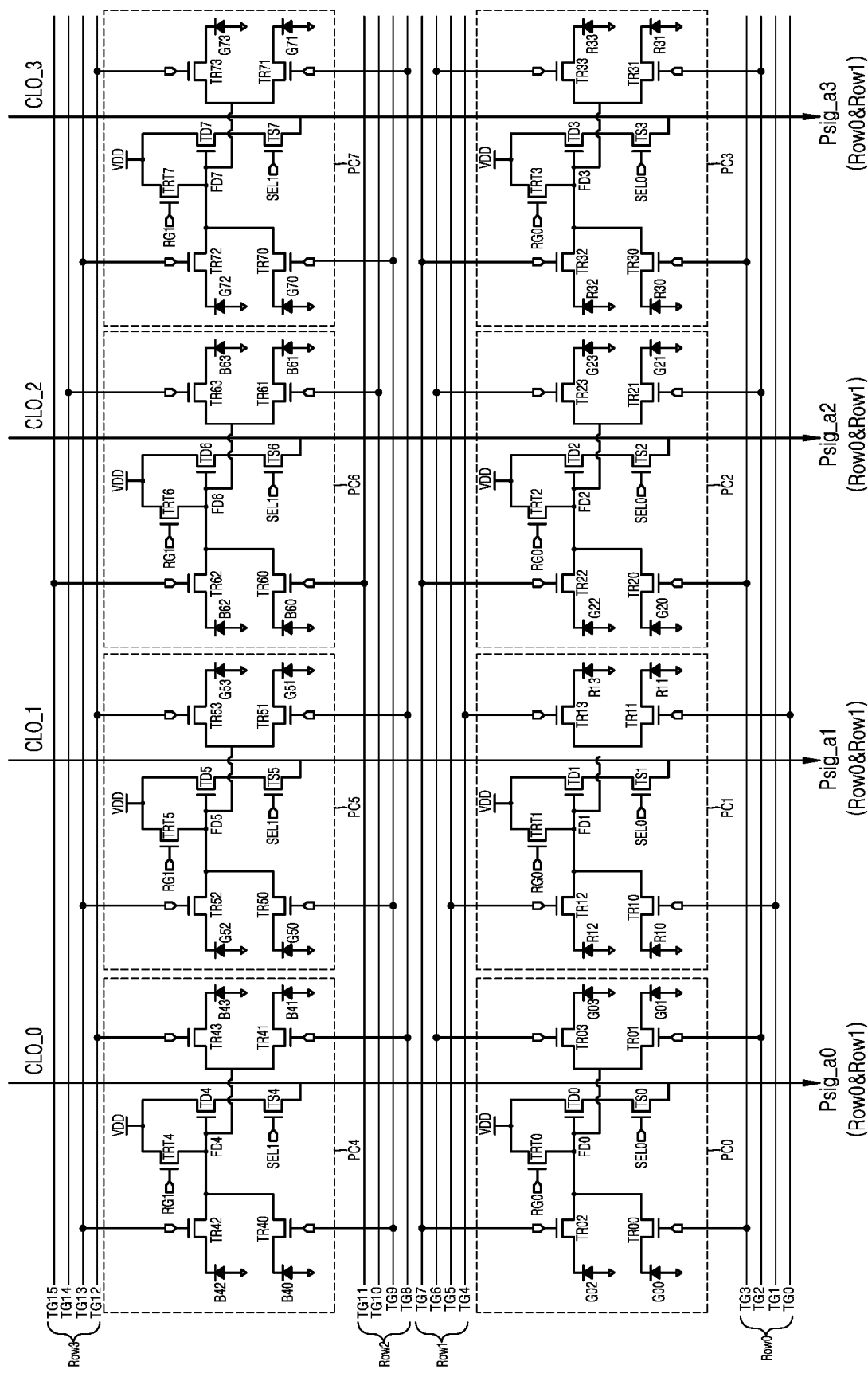

FIGS. 8A and 8B illustrate views showing a control method of a timing controller for a pixel circuit generating a pixel signal in the low-resolution operation mode, according to example embodiments.

Referring to FIG. 8A, the third transmission control signal TX2, the fourth transmission control signal TX3, the seventh transmission control signal TX6, and the eighth transmission control signal TX7 may have waveforms corresponding to the photo diodes G00 to G03 included in the first pixel circuit PC0, photo diodes G20 to G23 included in the third pixel circuit PC2, and photo diodes R30 to R33 included in the fourth pixel circuit PC3 to accumulate photocharge during a first period of time T1 (e.g., a long time) which is relatively long. For example, in the low-resolution operation mode, by using the third, fourth, seventh, and eighth transmission control signals TX2, TX3, TX6, and TX7, the first pixel circuit PC0, the third pixel circuit PC2 and the fourth pixel circuit PC3 that require a long-time exposure control may be controlled such that an exposure to light may start at the same first time.

The first transmission control signal TX0, the second transmission control signal TX1, the fifth transmission control signal TX4, and the sixth transmission control signal TX5 may have waveforms corresponding to the photo diodes R10 to R13 included in the second pixel circuit PC1 to accumulate photocharge during a second period of time T2 (e.g., a short time), which is relatively short. For example, the first, second, fifth, and sixth transmission control signals TX0, TX1, TX4, and TX5 may control the second pixel circuit PC1 that requires a short-time exposure control to start exposure to light at a second timing.

After an exposure to light is completed for a preset time for the photo diodes G00 to G03, R10 to R13, G20 to G23, and R30 to R33 respectively included in the first pixel circuit PC0, the second pixel circuit PC1, the third pixel circuit PC2, and the fourth pixel circuit PC3, an operation of outputting a pixel signal depending on photocharge accumulated in the photo diodes G00 to G03, R10 to R13, G20 to G23, and R30 to R33 may be performed. In detail, the first to eighth transmission control signals TX0 to TX7 may have a logic high value for a predetermined period (e.g. a first transmission period $T_a$) so that photocharge accumulated in the photo diodes G00 to G03, R10 to R13, G20 to G23, and R30 to R33 may be respectively delivered to the floating diffusion regions FD0 to FD3. Also, for a period including the first transmission period $T_a$ (e.g., read period, $ITV_{a1}$), a first reset control signal RS0 may have a logic low value so that each of the reset transistors TRT0 to TRT3 is turned off. In addition, a first selection signal SELS0 may have a logic high value for the read period $ITV_{a1}$ so that a reference signal and a pixel signal are output from the first to fourth pixel circuits PC0 to PC3 for the read period $ITV_{a1}$.

In detail, for the read period ITV$_{a1}$, a reference signal and a pixel signal may be output, the reference signal corresponding to an electric potential of each of the floating diffusion regions FD0 to FD3 reset to a predetermined power supply voltage level VDD according to a reset operation, and the pixel signal corresponding to an electric potential of each of the floating diffusion regions FD0 to FD3, after each photocharge accumulated in the photo diodes G00 to G03, R10 to R13, G20 to G23, and R30 to R33 is respectively delivered to the floating diffusion regions FD0 to FD3.

Meanwhile, further referring to FIG. 8B, a plurality of photo diodes included in a pixel circuit may have a structure in which a driving transistor, a reset transistor, and a selection transistor are shared. In the low-resolution operation mode, transmission control signals having the same pattern may be applied to transmission transistors included in a pixel circuit corresponding to the shared pixel exposed for a long time, and transmission control signals having the same pattern may be applied to transmission transistors included in a pixel circuit corresponding to the shared pixel exposed for a short time. For example, in the low-resolution operation mode, the transmission transistors TR00 to TR03 of the first pixel circuit PC0, the transmission transistors TR20 to TR23 of the third pixel circuit PC2, and the transmission transistors TR30 to TR33 of the fourth pixel circuit PC3, may respectively receive the third transmission control signal TX2, the fourth transmission control signal TX3, the seventh transmission control signal TX6, and the eighth transmission control signal TX7, each having a first signal pattern and thus, a long-time exposure may be controlled for each photo diode of the first, third, and fourth pixel circuits PC0, PC2, and PC3. Also, in the low-resolution operation mode, the transmission transistors TR10 to TR13 of the second pixel circuit PC1 may respectively receive the first transmission control signal TX0, the second transmission control signal TX1, the fifth transmission control signal TX4, and the sixth transmission control signal TX5, each having a second signal pattern and thus, a short-time exposure may be controlled for each photo diode of the second pixel circuit PC1.

In response to the first selection signal SELS0 having a logic high value for the read period ITV$_{a1}$ in the low-resolution operation mode, the pixel circuits PC0 to PC3 may output a pixel signal as respective multi-row lines unit through the first to fourth column output lines CLO_0 to CLO_3 respectively connected thereto. For example, the first pixel circuit PC0 may generate, in response to the first selection signal SELS0, a pixel signal Psig_a0 by using photocharge accumulated in photo diodes G00 and G01 connected to the transmission control signal lines TG3 and TG2 corresponding to the first row line Row0 and in the photo diode G02 and G03 connected to the transmission control signal lines TG7 and TG6 corresponding to the second row line Row1. The first pixel circuit PC0 may output the pixel signal Psig_a0 through the first column output line CLO_O. As described above, in the low-resolution operation mode, the pixel circuits PC0 to PC3 according to the inventive concept may respectively generate pixel signals Psig_a0 to Psig_a3 for a multi row lines unit by using the photo diodes connected to the first row line Row0 and the second row line Row1. However, this is an example embodiment, and the inventive concept is not limited thereto. As illustrated in FIGS. 4A and 4B, when the shared pixel includes nine or sixteen sub-pixels, an image sensor may be embodied so as to generate a pixel signal in a unit of three or more row lines.

In example embodiments, in the low-resolution operation mode, each photocharge accumulated in the photo diodes G00 to G03, R10 to R13, G20 to G23, and R30 to R33 may be simultaneously delivered to a corresponding floating diffusion region of the floating diffusion regions FD0 to FD3 and then each reference signal and each pixel signal of the floating diffusion regions FD0 to FD3 may be simultaneously output.

According to example embodiments, in the low-resolution operation mode, light detection is controlled by using a plurality of photo diodes included in the shared pixel so as to generate a pixel signal and thus, a wide dynamic range may be secured even under the low illumination condition.

Figure 9A:
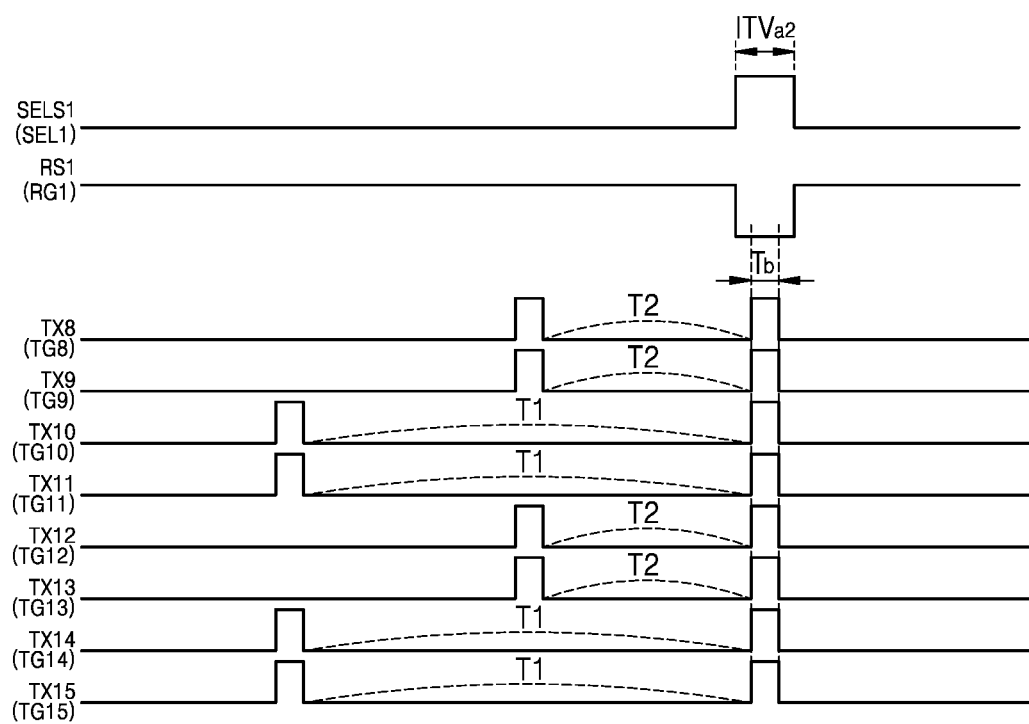
FIGS. 9A and 9B illustrate views showing a control method of a timing controller for a pixel circuit generating a pixel signal in a low-resolution operation mode, according to example embodiments.
Figure 9B:
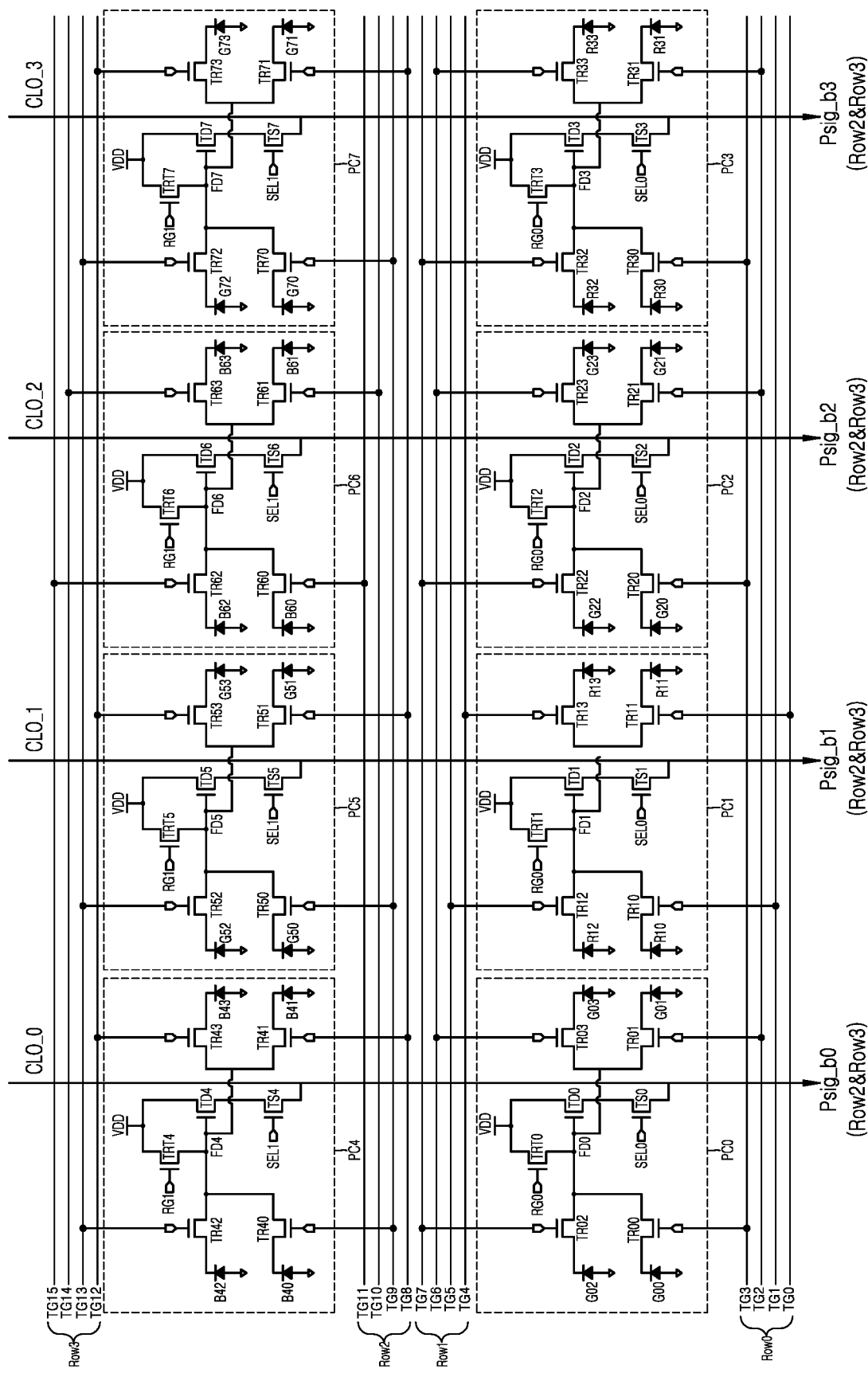

FIGS. 9A and 9B illustrate views showing a control method of a timing controller for a pixel circuit generating a pixel signal in the low-resolution operation mode, according to example embodiments.

FIGS. 8A and 8B are illustrated to describe a control method used when the first to fourth pixel circuits PC0 to PC3 are selected in response to the first selection signal SELS0, and FIGS. 9A and 9B are illustrated to describe a control method used when the fifth to eighth pixel circuits PC4 to PC7 are selected in response to a second selection signal SELS1 after the first to fourth pixel circuits PC0 to PC3 are selected in response to the first selection signal SELS0 and generate pixel signals.

Referring to FIG. 9A, the eleventh transmission control signal TX10, the twelfth transmission control signal TX11, the fifteenth transmission control signal TX14 and the sixteenth transmission control signal TX15 may have a waveform corresponding to the photo diodes B60 to B63 included in the seventh pixel circuit PC6 to accumulate photocharge during a first period of time T1 (e.g., a long time), which is relatively long. For example, by using the eleventh, twelfth, fifteenth, and sixteenth transmission control signals TX10, TX11, TX14, and TX15, the seventh pixel circuit PC6 that requires a long-time exposure control may be controlled to start exposure to light at a first time.

The ninth transmission control signal TX8, the tenth transmission control signal TX9, the thirteenth transmission control signal TX12, and the fourteenth transmission control signal TX13 may have a waveform corresponding to the photo diodes B40 to B43 included in the fifth pixel circuit PC4, the photo diodes G50 to G53 included in the sixth pixel circuit PC5, and the photo diodes G70 to G73 included in the eighth pixel circuit PC7 to accumulate photocharge during a second period of time T2 (e.g., a short time), which is relatively short. For example, by using the ninth, tenth, thirteenth, and fourteenth transmission control signals TX8, TX9, TX12, and TX13, the fifth pixel circuit PC4, the sixth pixel circuit PC5, and the eighth pixel circuit PC7 that require a short-time exposure control may be controlled to start exposure to light at the same second timing.

After an exposure to light is completed for a preset time for the photo diodes B40 to B43, G50 to G53, B60 to B63, and G70 to G73 respectively included in the fifth pixel circuit PC4, the sixth pixel circuit PC5, the seventh pixel circuit PC6, and the eighth pixel circuit PC7, an operation outputting a pixel signal may be performed depending on photocharge accumulated in the photo diodes B40 to B43, G50 to G53, B60 to B63, and G70 to G73. In detail, the ninth to sixteenth transmission control signals TX8 to TX15 may have a logic high value for a predetermined period (e.g., the second transmission period, T$_b$) so that photocharge accumulated in the photo diodes B40 to B43, G50 to G53, B60 to B63, and G70 to G73 are respectively delivered to the floating diffusion regions FD4 to FD7. In addition, for a period including the second transmission period $T_b$ (e.g., read period, $ITV_{a2}$), a second reset control signal RS1 may have a logic low value so that each of the reset transistors TRT4 to TRT7 is turned off. Also, the second selection signal SELS1 may have a logic high value for the read period $ITV_{a2}$ so that a reference signal and a pixel signal may be output from the fifth to eighth pixel circuits PC4 to PC7 for the read period $ITV_{a2}$.

Particularly, for the read period ($ITV_{a2}$), a reference signal corresponding to an electric potential of each of the floating diffusion regions FD4 to FD7 reset to the predetermined power supply voltage level VDD according to a reset operation and respective pixel signals corresponding to an electric potential of each of the floating diffusion regions FD4 to FD7, after each photocharge accumulated in the photo diodes B40 to B43, G50 to G53, B60 to B63, and G70 to G73 is respectively delivered to the floating diffusion regions FD4 to FD7, may be output.

Further referring to FIG. 9B, in response to the second selection signal SELS1 having a logic high value for the read period $ITV_{a2}$ in the low-resolution operation mode, the pixel circuits PC4 to PC7 may output pixel signals as respective multi row lines unit through the column output lines CLO_0 to CLO_3 respectively connected thereto. For example, the fifth pixel circuit PC4, in response to the second selection signal SELS1, may generate a pixel signal Psig_b0 by using photocharge accumulated in the photo diodes B40 and B41 connected to the transmission control signal lines TG9 and TG8 corresponding to the third row line Row2 and the photo diodes B42 and B43 connected to the transmission control signal lines TG13 and TG12 corresponding to the fourth row line Row3. The fifth pixel circuit PC4 may output the pixel signal Psig_b0 through the first column output line CLO_0. For example, in the low-resolution operation mode, the fifth to eighth pixel circuits PC4 to PC7 according to the inventive concept may generate the pixel signals Psig_b0 to Psig_b3 as each multi row lines unit by using the photo diodes connected to the third row line Row2 and the fourth row line Row3.

In example embodiments, in the low-resolution operation mode, each photocharge accumulated in the photo diodes B40 to B43, G50 to G53, B60 to B63, and G70 to G73 may be simultaneously delivered to a corresponding floating diffusion region of the floating diffusion regions FD4 to FD7 and then each reference signal and each pixel signal of the floating diffusion regions FD4 to FD7 may be simultaneously output.

Figure 10A:
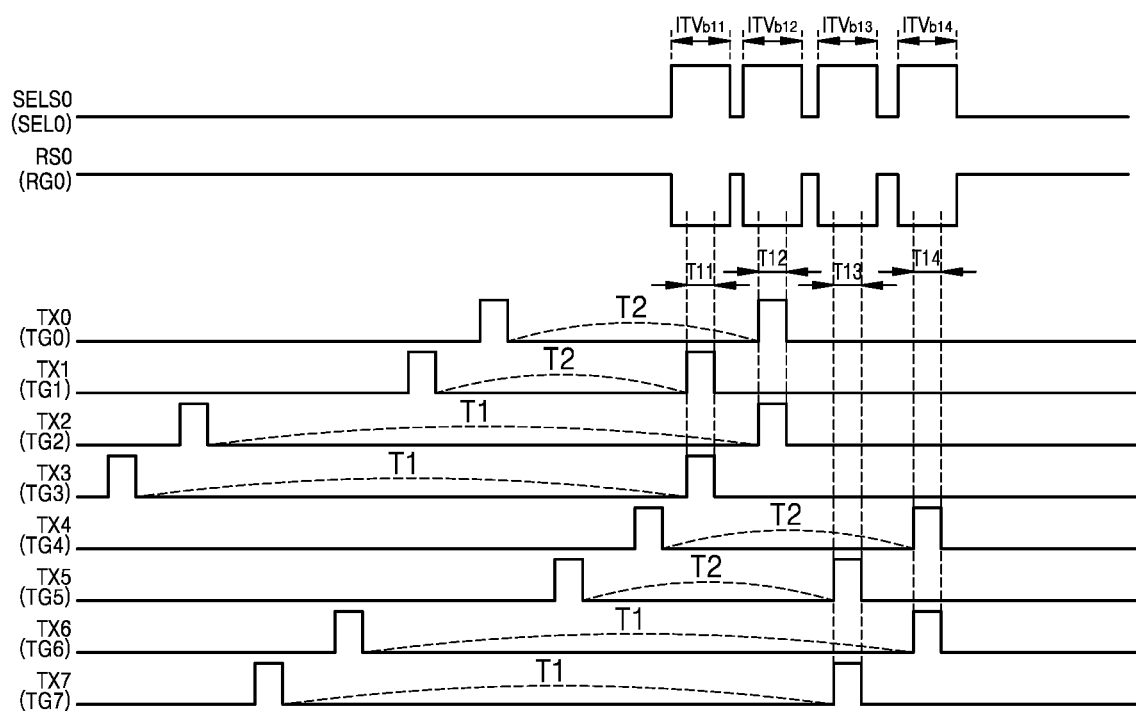
FIGS. 10A and 10B illustrate views showing a control method of a timing controller for a pixel circuit generating a pixel signal in a high-resolution operation mode, according to example embodiments.
Figure 10B:
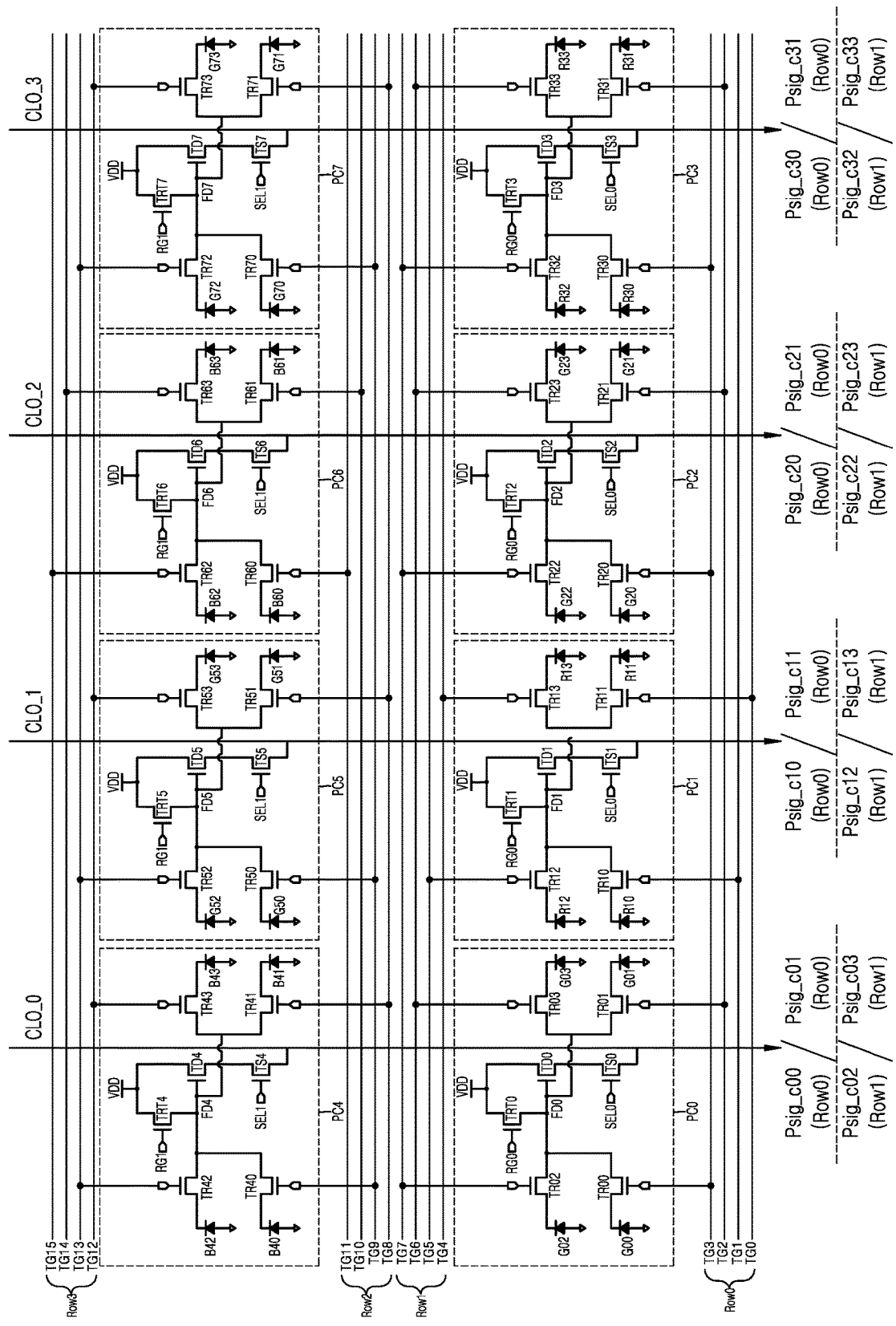

FIGS. 10A and 10B illustrate views showing a control method of a timing controller for a pixel circuit generating a pixel signal in the high-resolution operation mode, according to example embodiments.

Referring to FIG. 10A, in the high-resolution operation mode, the fourth transmission control signal TX3, the third transmission control signal TX2, the eighth transmission control signal TX7, and the seventh transmission control signal TX6 may have a waveform so as to accumulate photocharge during a first period of time T1 (e.g., a long time), which is relatively long, by staring to accumulate photocharge in an order of a photo diode G00, a photo diode G01, a photo diode G02, and a photo diode G03 of the first pixel circuit PC0, in an order of a photo diode G20, a photo diode G21, a photo diode G22, and a photo diode G23 of the third pixel circuit PC2, and in an order of a photo diode R30, a photo diode R31, a photo diode R32, and a photo diode R33 of the fourth pixel circuit PC3.

In addition, the second transmission control signal TX1, the first transmission control signal TX0, the sixth transmission control signal TX5, and the fifth transmission control signal TX4 may have a waveform to accumulate photocharge during a second period of time T2 (e.g., a short time), which is relatively short, by starting to accumulate photocharge in an order of a photo diode R10, a photo diode R11, a photo diode R12, and a photo diode R13 of the second pixel circuit PC1. For example, in the high-resolution operation mode, a timing to start to accumulate photocharge for each photo diode included in the pixel circuits PC0 to PC3 may differ. For example, the photo diode G00, the photo diode G01, the photo diode G02, and the photo diode G03 of the first pixel circuit PC0 may start to accumulate photocharge at different times.

After an exposure to light is completed for a preset time for the photo diodes G00 to G03, R10 to R13, G20 to G23, and R30 to R33 respectively included in the first pixel circuit PC0, the second pixel circuit PC1, the third pixel circuit PC2 and the fourth pixel circuit PC3, an operation of sequentially outputting pixel signals may be performed depending on the photocharge accumulated in the photo diodes G00 to G03, R10 to R13, G20 to G23, and R30 to R33.

The fourth transmission control signal TX3 and the second transmission control signal TX1 may have a logic high value for a first transmission period T11 so that the photocharge accumulated in the photo diode G00 of the first pixel circuit PC0, the photo diode R10 of the second pixel circuit PC1, the photo diode G20 of the third pixel circuit PC2, and the photo diode R30 of the fourth pixel circuit PC3 are delivered to respective floating diffusion regions FD0 to FD3.

The first reset control signal RS0 may have a low value so that each of the reset transistors TRT0 to TRT3 is turned off for a first read period $ITV_{b11}$ including the first transmission period T11. In addition, the first selection signal SELS0 may have a logic high value for the first read period $ITV_{b11}$ so that a reference signal and a pixel signal are output from each of the first pixel circuit PC0 to the fourth pixel circuit PC3 for the first read period $ITV_{b11}$. For the first read period $ITV_{b11}$, a reference signal corresponding to an electric potential of each of the floating diffusion regions FD0 to FD3 reset to a predetermined power supply voltage level VDD according to a reset operation and a pixel signal corresponding to an electric potential of each of the floating diffusion regions FD0 to FD3, after each photocharge accumulated in the photo diodes G00, R10, G20, and R30 are respectively delivered to the floating diffusion regions FD0 to FD3, may be output.

Also, the third transmission control signal TX2 and the first transmission control signal TX0 may have a logic high value for a second transmission period T12 so that the photocharge accumulated in the photo diode G01 of the first pixel circuit PC0, the photo diode R11 of the second pixel circuit PC1, the photo diode G21 of the third pixel circuit PC2, and the photo diode R31 of the fourth pixel circuit PC3 are respectively delivered to the floating diffusion regions FD0 to FD3. The first reset control signal RS0 may have a low value so that each of the reset transistors TRT0 to TRT3 is turned off for a second read period $ITV_{b12}$ including the second transmission period T12. In addition, the first selection signal SELS0 may have a logic high value for the second read period $ITV_{b12}$ so that a reference signal and a pixel signal are output from each of the first pixel circuit PC0 to the fourth pixel circuit PC3 for the second read period $ITV_{b12}$. For the second read period $ITV_{b12}$, a reference signal corresponding to an electric potential of each of the floating diffusion regions FD0 to FD3 reset to a predetermined power supply voltage level VDD according to a reset operation and a pixel signal corresponding to an electric potential of each of the floating diffusion regions FD0 to FD3, after each photocharge accumulated in the photo diodes G01, R11, G21, and R31 are respectively delivered to the floating diffusion regions FD0 to FD3, may be output.

In a manner as described above, a reference signal and a pixel signal may be generated for a third read period $ITV_{b13}$ by using the photo diode G02 of the first pixel circuit PC0, the photo diode R12 of the second pixel circuit PC1, the photo diode G22 of the third pixel circuit PC2, and the photo diode R32 of the fourth pixel circuit PC3, and a reference signal and a pixel signal may be generated for a fourth read period ($ITV_{b14}$) by using the photo diode G03 of the first pixel circuit PC0, the photo diode R13 of the second pixel circuit PC1, the photo diode G23 of the third pixel circuit PC2, and the photo diode R33 of the fourth pixel circuit PC3. Detailed descriptions thereof are omitted.

Meanwhile, further referring to FIG. 10B, a plurality of photo diodes included in a pixel circuit may have a structure in which a driving transistor, a reset transistor, and a selection transistor are shared. In the high-resolution operation mode, transmission control signals with different patterns may be applied to transmission transistors included in a pixel circuit. For example, in the high-resolution operation mode, the transmission transistors TR00 to TR03 of the first pixel circuit PC0, the transmission transistors TR20 to TR23 of the third pixel circuit PC2, and the transmission transistors TR30 to TR33 of the fourth pixel circuit PC3 may respectively receive the third transmission control signal TX2, the fourth transmission control signal TX3, the seventh transmission control signal TX6, and the eighth transmission control signal TX7 having different signal patterns and thus, a long-time exposure may be controlled for each photo diode of the first, third, and fourth pixel circuits PC0, PC2, and PC3. Also, in the high-resolution operation mode, the transmission transistors TR10 to TR13 of the second pixel circuit PC1 may respectively receive the first transmission control signal TX0, the second transmission control signal TX1, the fifth transmission control signal TX4, and the sixth transmission control signal TX5 having different signal patterns and thus, a short-time exposure may be controlled for each photo diode of the second pixel circuit PC1.

In response to the first selection signal SELS0 having a logic high value for the first read period $ITV_{b11}$ in the high-resolution operation mode, the pixel circuits PC0 to PC3 may each output a pixel signal as a respective single row line unit through the column output lines CLO_0 to CLO_3 respectively connected thereto. For example, for the first read period $ITV_{b11}$, the first pixel circuit PC0, the third pixel circuit PC2, and the fourth pixel circuit PC3 may generate respective pixel signals Psig_c00, Psig_c20, and Psig_c30 by using the photocharge accumulated in the photo diode G00, the photo diode G20, and the photo diode R30 connected to the fourth transmission control signal line TG3 corresponding to the first row line Row0, and the second pixel circuit PC1 may generate a pixel signal Psig_c10 by using the photocharge accumulated in the photo diode R10 connected to the second transmission control signal line TG1 corresponding to the first row line Row0. In this manner as described above, for the second read period $ITV_{b12}$, the pixel circuits PC0 to PC3 may respectively generate the pixel signals Psig_c01, Psig_c11, Psig_c21, and Psig c31 of a single row line unit corresponding to the first row line Row0, and for the third read period $ITV_{b13}$, the pixel circuits PC0 to PC3 may respectively generate the pixel signals Psig_c02, Psig_c12, Psig_c22, and Psig_c32 of a single row line unit corresponding to the second row line Row1, and for the fourth read period $ITV_{b14}$, the pixel circuits PC0 to PC3 may respectively generate the pixel signals Psig_c03, Psig_c13, Psig_c23, and Psig_c33 of a single row line unit corresponding to the second row line Row1.

As described above, the photo diodes respectively corresponding to the sub-pixels included in the shared pixel may be individually controlled so that a pixel signal may be generated for each sub-pixel included in the shared pixel in the high-resolution operation mode. For example, regardless of a structure of the shared pixel, a wide dynamic range may also be secured at the same time.

Figure 11A:
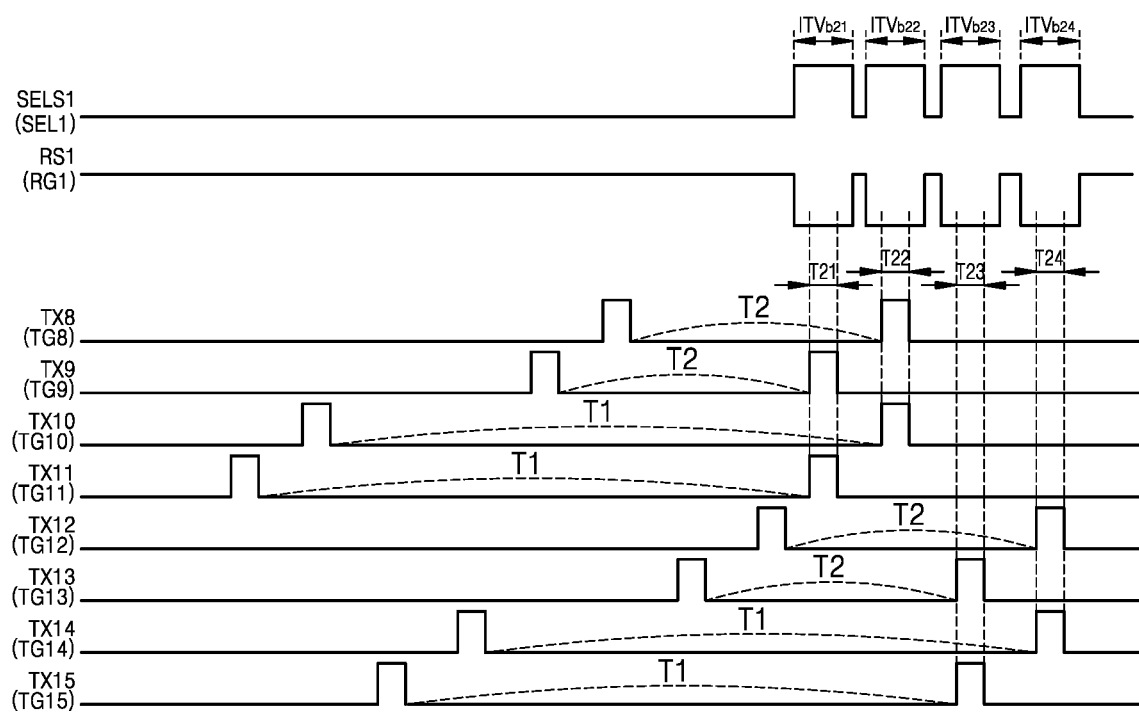
FIGS. 11A and 11B illustrate views showing a control method of a timing controller for a pixel circuit generating a pixel signal in a high-resolution operation mode, according to example embodiments.
Figure 11B:
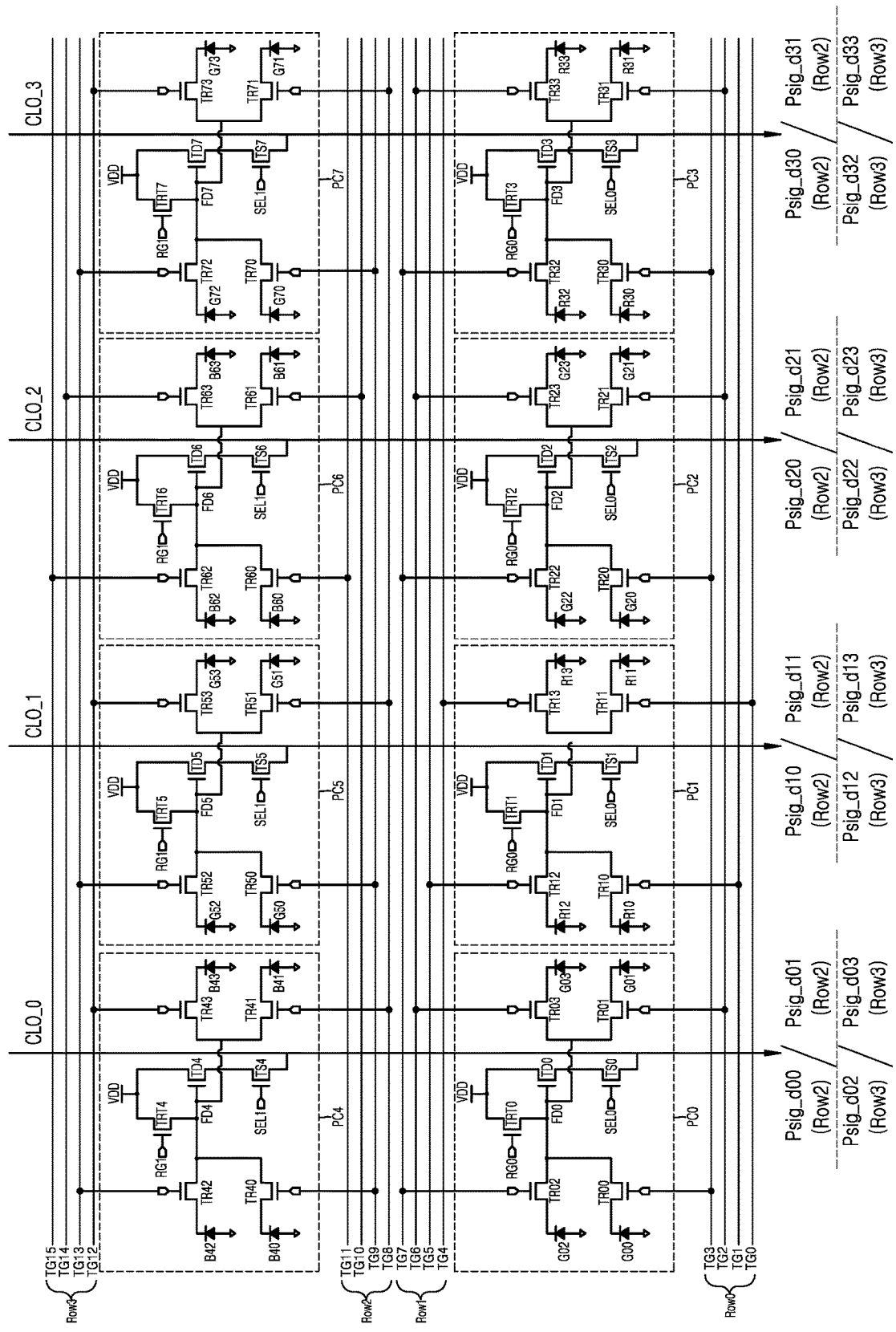

FIGS. 11A and 11B illustrate views showing a control method of a timing controller for a pixel circuit generating a pixel signal in the high-resolution operation mode, according to example embodiments.

FIGS. 10A and 10B illustrate views of a control method when the first to fourth pixel circuits PC0 to PC3 are selected in response to the first selection signal SELS0. Next, FIGS. 11A and 11B illustrate views of a control method of when the fifth to eighth pixel circuits PC4 to PC8 are selected in response to the second selection signal SELS1 after the first to fourth pixel circuits PC0 to PC3 are selected to generate pixel signals in response to the first selection signal SELS0.

Referring to FIG. 11A, in the high-resolution operation mode, the twelfth transmission control signal TX11, the eleventh transmission control signal TX10, the sixteenth transmission control signal TX15, and the fifteenth transmission control signal TX14 may have a waveform to accumulate photocharge during the first period of time T1, which is relatively long, by starting to accumulate photocharge in an order of the photo diode B60, the photo diode B61, the photo diode B62, and the photo diode B63 of the seventh pixel circuit PC6.

In the high-resolution operation mode, the tenth transmission control signal TX9, the ninth transmission control signal TX8, the fourteenth transmission control signal TX13, and the thirteenth transmission control signal TX12 may have a waveform to accumulate photocharge during the second period of time T2, which is relatively short, by starting to accumulate photocharge in an order of the photo diode B40, the photo diode B41, the photo diode B42, and the photo diode B43 of the fifth pixel circuit PC4, in an order of the photo diode G50, the photo diode G51, the photo diode G52, and the photo diode G53 of the sixth pixel circuit PC5, and in an order of the photo diode G70, the photo diode G71, the photo diode G72, and the photo diode G73 of the eighth pixel circuit PC7.

After an exposure to light is completed for a preset time for the photo diodes B40 to B43, G50 to G53, B60 to B63, and G70 to G73 respectively included in the fifth pixel circuit PC4, the sixth pixel circuit PC5, the seventh pixel circuit PC6, and the eighth pixel circuit PC7, an operation of sequentially outputting pixel signals depending on the photocharge accumulated in the photo diodes B40 to B43, G50 to G53, B60 to B63, and G70 to G73 may be performed.

Meanwhile, further referring to FIG. 11B, in response to the first selection signal SELS0 having a logic high value for a first read period $ITV_{b21}$ in the high-resolution operation mode, the fifth to eighth pixel circuits PC4-PC7 may each output a pixel signal as a respective single row line unit through the column output lines CLO_0 to CLO_3 respectively connected thereto. For example, for the first read period $ITV_{b21}$, the fifth pixel circuit PC4, the sixth pixel circuit PC5, and the eighth pixel circuit PC7 may respectively generate pixel signals Psig_d00, Psig_d10, and Psig_d30 by using the photocharge accumulated in the photo diode B40, the photo diode G50, and the photo diode G70 connected to the tenth transmission control signal line TG9 corresponding to the third row line Row2, and the seventh pixel circuit PC6 may generate a pixel signal Psig_d20 by using the photocharge accumulated in the photo diode B60 connected to the twelfth transmission control signal line TG11 corresponding to the third row line Row2. In the manner as described above, for a second read period $ITV_{b22}$, the fifth to eighth pixel circuits PC4 to PC7 may respectively generate pixel signals Psig_d01, Psig_d11, Psig_d21, and Psig_d31 of a single row line unit corresponding to the third row line Row2, and for a third read period $ITV_{b23}$, the fifth to eighth pixel circuits PC4 to PC7 may respectively generate pixel signals Psig_d02, Psig_d12, Psig_d22, and Psig_d32 of a single row line unit corresponding to the fourth row line Row3, and for a fourth read period $ITV_{b24}$, the first to fourth pixel circuits PC0 to PC3 may respectively generate pixel signals Psig_d03, Psig_d13, Psig_d23, and Psig_d33 of a single row line unit corresponding to the fourth row line Row3.

Figure 12:
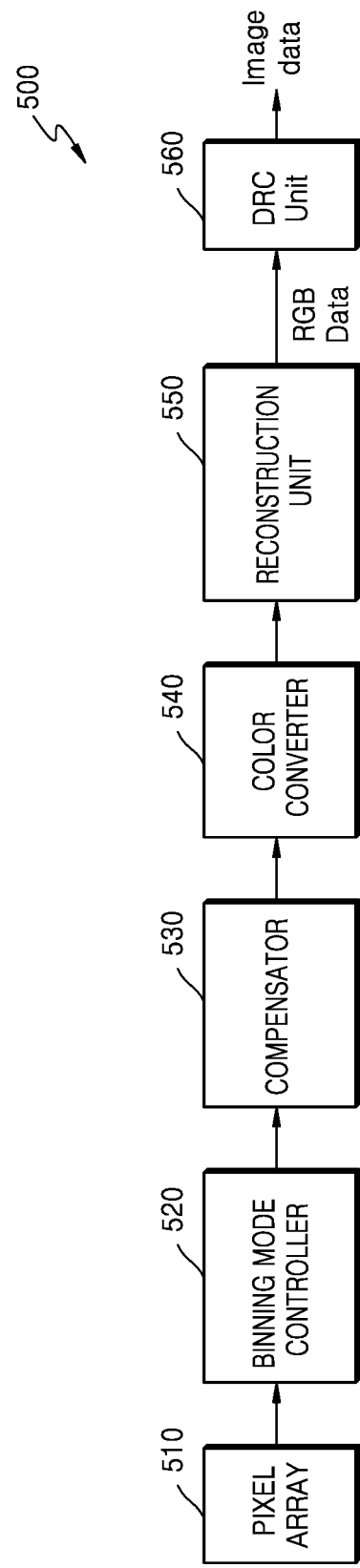
FIG. 12 illustrates a block diagram showing an example of an image sensor and a binning operation according to example embodiment of the inventive concept.

FIG. 12 illustrates a block diagram showing an example of an image sensor and a binning operation according to an example embodiment of the inventive concept. An image sensor 500 of FIG. 12 may include a pixel array 510, a binning mode controller 520, a compensator 530, a color converter 540, a reconstruction unit 550, and a dynamic range compression (DRC) unit 560.

The pixel array 510 may include pixels described in the aforementioned embodiments, and thus, each shared pixel included in the pixel array 510 may include a plurality of photo diodes. As an example, the first shared pixel of the pixel array 510 may include a plurality of photo diodes for generating a high-sensitivity pixel signal, and the second shared pixel may include a plurality of photo diodes for generating a low-sensitivity pixel signal. Also, the photo diodes of the first shared pixel may be exposed to light for a relatively long-time, but the photo diodes of the second shared pixel may be exposed to light for a relatively short-time.

In addition, at least some of various functional blocks illustrated in FIG. 12 may be a configuration included in the image sensor 100 of FIG. 1. For example, at least some functional blocks of the binning mode controller 520, the compensator 530, the color converter 540, the reconstruction unit 550, and the DRC unit 560 may be included in the image sensor 100 of FIG. 1.

Under the control of the binning mode controller 520, pixel data from all pixels included in the pixel array 510 or pixel data from some of the pixels may be used depending on a binning mode.

The compensator 530 processes the received pixel data to compensate one or more pixels. For example, in order to compensate a predetermined color pixel (e.g., red pixel), a compensation operation may be performed by using pixel data of one or more neighboring pixels (e.g., red, blue and green pixels adjacent to the predetermined color pixel. As an embodiment, in order to perform the compensation operation for high-sensitivity pixel data of the predetermined color pixel, high-sensitivity pixel data for each of one or more neighboring pixels may be used. For example, the high-sensitivity pixel data generated from the predetermined color pixel may be compensated by using the high-sensitivity pixel data generated from the neighboring pixels. Similarly, low-sensitivity pixel data generated from the predetermined color pixel may be compensated by using low-sensitivity pixel data generated from neighboring pixels.

Also, the compensator 530 may perform a re-mosaic algorithm according to an operation mode of an image sensor and compensate a pixel signal generated from a pixel array. For example, the compensator 530 may perform a compensation operation for a pixel signal generated from a pixel array based on a re-mosaic algorithm in an operation mode under a high illumination condition.

The color converter 540 performs a color conversion operation in which color sensed from the pixel array 510 is converted into RGB color. The pixel array 510 may include other types of color filters other than the RGB color filter, for example, the color filter of the pixel array 510 may include a RGBW color component or may generate a pixel signal having a color component with another pattern. The color converter 540 may perform a calculation for pixel data according to a predetermined algorithm and then generate pixel data having an RGB color component corresponding to a standard image signal.

The reconstruction unit 550 may perform a signal reconstruction process and thus perform an image composition operation described in the aforementioned embodiments. In other words, the reconstruction unit 550 may receive pixel data having different sensitivities for any one image, and thus, generate and output RGB pixel data having an improved dynamic range. The DRC unit 560 may perform a compression operation without a loss of a dynamic range regarding RGB pixel data from the reconstruction unit 550. Due to a compression function by the DRC unit 560, a universal processor (e.g., digital signal processor (DSP), etc.) may be used in a post-processing operation.

Figure 13:
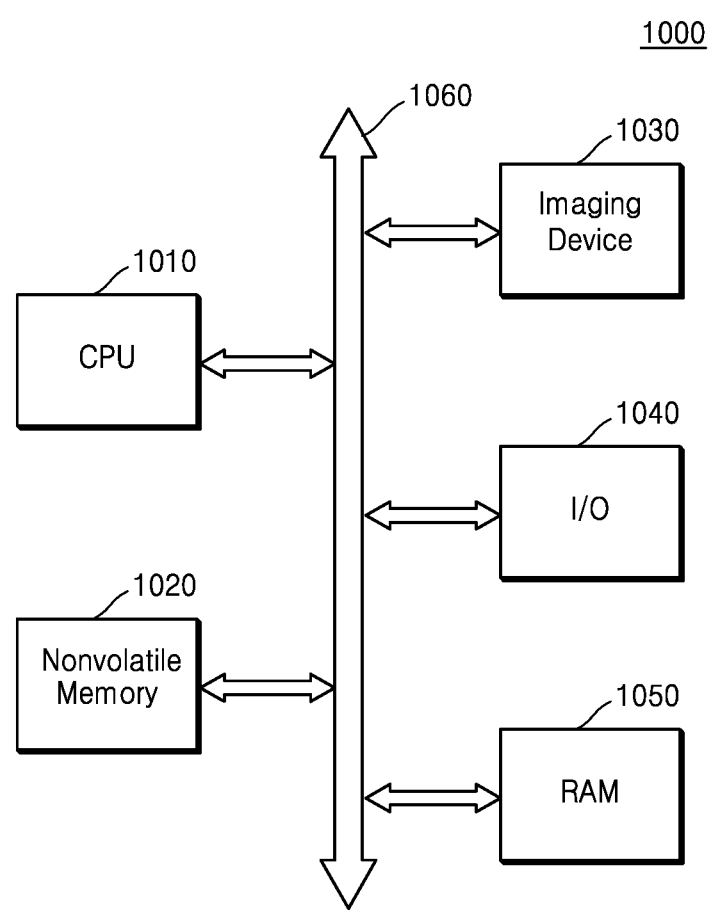
FIG. 13 illustrates a block diagram showing a system including an image sensor according to example embodiments of the inventive concept.

FIG. 13 illustrates a block diagram showing a system including an image sensor according to example embodiments of the inventive concept. A system 1000 of FIG. 13 may include a computer system, a camera system, a scanner, a mobile navigation, a video phone, a security system, and a movement detecting system that require image data. Referring to FIG. 13, the system 1000 may include a central processing unit or processor 1010, a nonvolatile memory 1020, an imaging device 1030 including an image sensor, an input-output device 1040 and a RAM 1050. The central processing unit 1010 may communicate with the nonvolatile memory 1020, the imaging device 1030, the input-output device 1040 and the RAM 1050 through a bus 1060.

The imaging device 1030 included in the system 1000 of FIG. 13 may include the image sensor described above according to example embodiments of the inventive concept. For example, an image sensor included in the imaging device 1030 may include a plurality of shared pixels, and each of the shared pixels may include a plurality of photo diodes. The shared pixel may be identified as the shared pixel exposed for a long time or the shared pixel exposed for a short time, and controls for generating a pixel signal may differ based on an operation mode.

Image data output from the imaging device 1030 may be delivered to the central processing unit 1010, the nonvolatile memory 1020, the input-output device 1040 and the RAM 1050 through the bus 1060. The imaging device 1030 according to example embodiment of the inventive concept may provide an improved image having a wide dynamic range.

While the inventive concept has been particularly shown and described with reference to embodiments thereof, it will be understood that various changes in form and details may be made therein without departing from the spirit and scope of the following claims.

What is claimed is:

1. An image sensor comprising:
a pixel array comprising a plurality of shared pixels arranged in rows and columns, wherein a first shared pixel and a second shared pixel of the shared pixels are adjacent to each other in a row direction and connected to one selection signal line; and
a timing controller configured to control a generation of pixel signals from the first shared pixel and the second shared pixel based on an operation mode of the image sensor,
wherein the first shared pixel comprises two or more photo diodes in a first row and two or more photo diodes in a second row adjacent to the first row, the photo diodes of the first shared pixel are configured to be exposed to light during a first period of time, and the first shared pixel comprises a first floating diffusion region shared by the photo diodes of the first shared pixel,
wherein the second shared pixel comprises two or more photo diodes in the first row and two or more photo diodes in the second row, the photo diodes of the second shared pixel are configured to be exposed to light during a second period of time shorter than the first period of time, and the second shared pixel comprises a second floating diffusion region shared by the photo diodes of the second shared pixel,
wherein the first and second floating diffusion regions are not directly electrically connected to each other, and
wherein, in a first operation mode, the timing controller is configured to control a generation of the pixel signals such that the photo diodes of the first shared pixel start to accumulate photocharge at a first time, and the photo diodes of the second shared pixel start to accumulate photocharge at a second time after the first time.

2. The image sensor of claim 1, wherein the image sensor is configured such that when the image sensor captures an image corresponding to a frame, an amount of photocharge accumulated in each of the photo diodes of the first shared pixel is greater than an amount of photocharge accumulated in each of the photo diodes of the second shared pixel.

3. The image sensor of claim 1, wherein each of the first shared pixel and the second shared pixel has a different spectral sensitivity.

4. The image sensor of claim 1, wherein the timing controller is configured to control a generation of the pixel signals at a third time after the second time such that the accumulated photocharge is delivered from the photo diodes of the first shared pixel to the first floating diffusion region, and the accumulated photocharge is delivered from the photo diodes of the second shared pixel to the second floating diffusion region.

5. The image sensor of claim 4, wherein during a predetermined read period, the timing controller is configured to control a generation of the pixel signals such that a first pixel signal is output through a first column output line connected to the first shared pixel and a second pixel signal is output through a second column output line connected to the second shared pixel.

6. The image sensor of claim 1, wherein the two or more photo diodes in the first row of the first shared pixel comprise a first photo diode and a second photo diode,
wherein the two or more photo diodes in the first row of the second shared pixel comprise a third photo diode and a fourth photo diode, and
wherein, in the first operation mode, the timing controller is configured to differently control a generation of the pixel signals such that accumulation of photocharge of the first shared pixel is started at a different time for each of the first photo diode and the second photo diode and accumulation of photocharge of the second shared pixel is started at a different time for each of the third photo diode and the fourth photo diode.

7. The image sensor of claim 6, wherein the timing controller is configured to control sequentially the accumulation of photocharge by the first photo diode and the second photo diode and sequentially the accumulation of photocharge by the third photo diode and the fourth photo diode.

8. The image sensor of claim 6, wherein the timing controller is configured to control a generation of the pixel signals such that:
the accumulated photocharge of the first and third photo diodes is delivered to the first and second floating diffusion regions, respectively, at the same first time, and
the accumulated photocharge of the second and fourth photo diodes is delivered to the first and second floating diffusion regions, respectively, at the same second time.

9. The image sensor of claim 8, wherein the timing controller is configured to control a generation of the pixel signals, such that:
during a first read period, a first pixel signal of the pixel signals corresponding to the accumulated photocharge from the first photo diode is output through a first column output line connected to the first shared pixel and a second pixel signal of the pixel signals corresponding to the accumulated photocharge from the third photo diode is output through a second column output line connected to the second shared pixel, and
during a second read period, a third pixel signal of the pixel signals corresponding to the accumulated photocharge from the second photo diode is output through the first column output line and a fourth pixel signal of the pixel signals corresponding to the accumulated photocharge from the fourth photo diode is output through the second column output line.

10. The image sensor of claim 1, wherein each of the first shared pixel and the second shared pixel comprises 2×2 sub-pixels, and each of the first shared pixel and the second shared pixel is connected to two row lines,
wherein each of the sub-pixels includes a transmission transistor connected to a corresponding photo diode, and
wherein each of the two row lines includes four transmission control signal lines each connected to a corresponding transmission transistor.

11. An image sensor comprising:
a pixel array comprising a first shared pixel that comprises a first sub-pixel connected to a first row line and a second sub-pixel connected to a second row line and a second shared pixel that comprises a third sub-pixel connected to the first row line and a fourth sub-pixel connected to the second row line; and
a timing controller configured to control a long-time exposure operation for the first shared pixel and a short-time exposure operation for the second shared pixel such that the pixel array outputs pixel signals based on an operation mode of the image sensor,
wherein each of the first and second sub-pixels has a first color filter sensing a first color and each of the third and fourth sub-pixels has a second color filter sensing a second color different from the first color, and
wherein each of the first and second row lines includes at least two transmission control signal lines.

12. The image sensor of claim 11, wherein each of the first through fourth sub-pixels comprises a photo diode,
- wherein the pixel array outputs the pixel signals as multi row lines unit by simultaneously delivering photocharge of the photo diodes of the first through fourth sub-pixels, or
- wherein the pixel array outputs the pixel signals as a single row line unit by sequentially delivering photocharge of the photo diodes of the first and third sub-pixels followed by sequentially delivering photocharge of the photo diodes of the second and fourth sub-pixels.

13. The image sensor of claim 12, wherein, in a first operation mode,
- the timing controller is configured such that the first sub-pixel and the second sub-pixel accumulate photocharge during a first period of time, and the third sub-pixel and the fourth sub-pixel accumulate photocharge during a second period of time shorter than the first period of time.

14. The image sensor of claim 13, wherein in a predetermined read period,
- the timing controller is configured to control a first pixel signal of the pixel signals corresponding to photocharge accumulated during the first period of time, as a signal of the multi row lines unit, through a first column output line connected to the first shared pixel, and to output a second pixel signal of the pixel signals corresponding to photocharge accumulated during the second period of time, as a signal of the multi row lines unit, through a second column output line connected to the second shared pixel.

15. The image sensor of claim 13, wherein, in a second operation mode,
- the timing controller is configured such that the first sub-pixel and the second sub-pixel sequentially start to accumulate photocharge and then accumulate the photocharge during the first period of time, and the third sub-pixel and the fourth sub-pixel sequentially start to accumulate photocharge and then accumulate the photocharge during the second period of time.

16. The image sensor of claim 15, wherein the timing controller is configured such that the pixel array outputs:
- during a first read period, a first pixel signal of the pixel signals corresponding to photocharge accumulated in the first sub-pixel during the first period of time through a first column output line connected to the first shared pixel, and a second pixel signal of the pixel signals corresponding to photocharge accumulated in the third sub-pixel during the second period of time through a second column output line connected to the second shared pixel, and
- during a second read period, a third pixel signal of the pixel signals corresponding to photocharge accumulated in the second sub-pixel during the first period of time through the first column output line, and a fourth pixel signal of the pixel signals corresponding to photocharge accumulated in the fourth sub-pixel during the second period of time through the second column output line.

17. An image sensor comprising;
- a pixel array including a plurality of shared pixels arranged in rows and columns,
- wherein the shared pixels include a first shared pixel and a second shared pixel disposed adjacent to the first shared pixel in a row direction or a column direction, each of the first and second shared pixel includes:
  - a first set of photo diodes disposed in a first row,
  - a second set of photo diodes disposed in a second row adjacent to the first row, and
  - a floating diffusion region shared by transmission transistors, each of the transmission transistors connected to a corresponding photo diode of the first and second sets of photo diodes, and
- wherein each photo diode of the first shared pixel has a first color filter sensing a first color and each photo diode of the second shared pixel has a second color filter sensing a second color different from the first color.

18. The image sensor of claim 17, wherein the pixel array has a first color pattern in the first row, a second color pattern different from the first color pattern in the second row, a third color pattern in a first column, and a fourth color pattern different from the third color pattern in a second column adjacent to the first column.

19. The image sensor of claim 17, wherein the image sensor is configured such that the photo diodes of the first shared pixel are exposed to light for a first period of time, and the photo diodes of the second shared pixel are exposed to light for a second period of time shorter than the first period of time.

* * * * *